United States Patent
Esra et al.

(10) Patent No.: US 12,093,400 B1
(45) Date of Patent: Sep. 17, 2024

(54) SYSTEMS AND METHODS FOR MODEL SECURITY IN DISTRIBUTED MODEL TRAINING APPLICATIONS

(71) Applicant: BOBI, INC., San Antonio, TX (US)

(72) Inventors: David Esra, San Antonio, TX (US); Susanna Cox, Chattanooga, TN (US)

(73) Assignee: BOBI, INC., San Antonio, TX (US)

(*) Notice: Subject to any disclaimer, the term of this patent is extended or adjusted under 35 U.S.C. 154(b) by 0 days.

(21) Appl. No.: 18/588,781

(22) Filed: Feb. 27, 2024

Related U.S. Application Data

(60) Provisional application No. 63/450,541, filed on Mar. 7, 2023.

(51) Int. Cl.
| | |
|---|---|
| G06F 21/56 | (2013.01) |
| G06F 21/57 | (2013.01) |
| G06N 5/04 | (2023.01) |
| G06N 20/00 | (2019.01) |

(52) U.S. Cl.
CPC ............ G06F 21/577 (2013.01); G06F 21/56 (2013.01); G06N 5/04 (2013.01); G06N 20/00 (2019.01); *G06F 2221/034* (2013.01)

(58) Field of Classification Search
CPC .. G06F 21/577; G06F 21/56; G06F 2221/034; G06N 5/04; G06N 20/00
See application file for complete search history.

(56) References Cited

U.S. PATENT DOCUMENTS

| | | | |
|---|---|---|---|
| 11,514,162 B1* | 11/2022 | Sevcenko | ............ G06F 21/565 |
| 2020/0349262 A1* | 11/2020 | Seo | ........ G06F 21/602 |
| 2022/0175324 A1 | 6/2022 | Holder et al. | |
| 2023/0138458 A1* | 5/2023 | Wei | ........ H04L 63/145 |
| | | | 726/23 |
| 2023/0170087 A1 | 6/2023 | Holder et al. | |
| 2023/0200746 A1 | 6/2023 | Holder et al. | |
| 2023/0214711 A1* | 7/2023 | Paulraj | ........ G06F 21/60 |
| | | | 706/12 |

OTHER PUBLICATIONS

Susanna Cox, Securing AIML Systems in the Age of Information Warfare, Critical Alliance, Apr. 2022.

* cited by examiner

*Primary Examiner* — Ali S Abyaneh
(74) *Attorney, Agent, or Firm* — Outlier Patent Attorneys, PLLC

(57) ABSTRACT

The present disclosure is for systems and methods for data and model security in AI-based modeling approaches. Security techniques are applied at the user device level on edge devices to evaluate data and/or locally trained models for malicious content. Malicious content is detected and can be prevented from influencing central model updates or retraining.

20 Claims, 16 Drawing Sheets

SYSTEMS AND METHODS FOR MODEL SECURITY IN DISTRIBUTED MODEL TRAINING APPLICATIONS

CROSS-REFERENCE TO RELATED APPLICATIONS

This application claims the benefit of U.S. Provisional Application 63/450,541, filed Mar. 7, 2023, titled "PREGNANCY MONITORING FOR REAL-TIME ALERTING AND META ANALYSIS," which is herein incorporated by reference in its entirety.

BACKGROUND

Field of Art

The invention relates to model security and development related to improving models through multiple sources of data and results, further looking for maintaining user data security through encryption, differential privacy techniques and federated architecture.

Discussion of the State of the Art

Artificial intelligence (AI) is becoming more prevalent in everyday life. With increased prevalence comes increased opportunity for malicious actions against the machine learning operations. In some circumstances, machine learning security operations (MLSecOps) are employed to ensure data security and model integrity associated with machine learning. Current approaches to implementing this security generally include applying security measures and continuous monitoring approaches at the server level or central model level. This however comes with drawbacks, such as increased load on the central server, limitations on the source of the malicious actions, and delays in discovering the malicious actions. There is a need for improved model and data security in machine learning to reduce malicious actions against AI and ensure the integrity of models being used for a variety of applications.

One particular area where improved model security and integrity are of great importance includes AI-based evaluation of health related data and predicting health outcomes, such as in pregnancy related monitoring and outcome prediction. Women die as a result of complications during and following pregnancy and childbirth. According to the World Health Organization, about 295,000 women died during and following pregnancy and childbirth in 2017. Many of these complications develop during pregnancy and most are preventable or treatable. Other complications may exist before pregnancy but are worsened during pregnancy, especially if not managed as part of the woman's care. Current methods of tracking women's healthcare are done through interactions with skilled health professionals which occur infrequently when compared to the total time of pregnancy However, in order to prevent or manage complications, there is a need to rapidly detect when maternal health conditions are adverse or may be progressing towards an adverse state. Moreover, upon detection, there is a need to alert expecting mothers and/or healthcare providers so that the complication can be addressed. Furthermore, over time it is important to identify new risk factors as well as new factors influencing a healthy (or healthier) pregnancy outcome. This requires high quality data and vast amounts of data which are quite challenging to obtain through existing channels such as research studies or insurance claims data.

Current methods may comprise allowing a user to share their data with health professionals, but this sharing may expose the user to unwanted risk.

The amount of data gathered may be of such a large quantity that it may be difficult for a professional to interpret and therefore data must be gathered in a central location. Professional solutions to data protection include encrypting the data before sending the data and decrypting it when it is gathered into a database to be used. Unfortunately, no encryption method is flawless and unable to be decrypted by outside parties. In order to prevent this type of decryption, large amounts of data may be stored on user devices, but this creates a larger burden for modeling, and incomplete data sets may be present.

In order to share data amongst various users, and create a better model, a process called federated architecture may be implemented to share models across devices. This maintains the data on a user's device while sending updated models to a database. This process may prevent data from being intercepted, but if the model is stolen by an outside party, it may be reverse engineered to discover what the user data was that made the updated model.

SUMMARY

The present invention employs a user device level security portfolio to identify and catch malicious actions at the source as opposed to having to rely solely on detection at the server level. There are multiple advantages to shifting model security analytics onto the client device. By allowing edge sensors to monitor potential malicious data manipulation on-device, both individual bad actors, and malicious group activity (such as botnets), can be identified at the device level. Time to incident awareness, as well as post-incident response times, can be minimized via on-device monitoring and minimal backend data upload. Analytic computation burden can be shifted, at least in part, to client devices, reducing central server load, and ensuring low-latency security. Because compute burden is shifted to the edge, on-device data security review via federated analytics represents an additional layer of security with very little cost for the control organization. Furthermore, by broadcasting only incidents meeting a threshold back the central server, and not the client data itself, security monitoring is minimally invasive, and privacy-preserving.

The present invention further provides systems and methods for monitoring health data associated with pregnancies in real-time and providing alerts when adverse conditions are identified. The monitored health data is used to detect criteria associated with an adverse condition. When such criteria are met, alerting systems and processes are used to notify end users (e.g. pregnant individuals) and/or healthcare providers. Furthermore, the monitored health data can be aggregated over time to build the high quality, vast data sets needed for analysis for continued improvement in pregnancy health and outcomes. The aggregated data may also be used in training of models to be used in the above mentioned monitoring and alerting thereby leading to improved pregnancy complication prevention and/or management.

The invention is capable of optionally sharing data between a user device and a main database through permissions from users, however, the model may also be improved through improved methods of using federated architecture to counteract problems of sending user data across an internet. In addition, differential privacy techniques may be applied to the data set in order to maintain user data integrity.

The invention may comprise a computer implemented method for edge device level security analytics, the computer implemented method comprising: creating a first local model on a user device by deploying a first central model to the user device, wherein the first central model is trained to analyze user data and provide at least one predictive inference; obtaining, in near real-time, digital data associated with a user, the digital data obtained from the user device, the digital data associated with at least one of user physiology data and health data; generating a first data set from at least one of a portion of the obtained digital data; applying a local data security review to the first data set; filtering the first data set to exclude data which fails the local data security review; generating a second data set by applying differential privacy techniques to the first data set based on the local data security review results; training a second local model using the second data set; applying a local model security review to the second local model; applying a central model security review to each local model received by a central model processing system; aggregating a plurality of second local models created across a plurality of user devices associated with a plurality of different users based on the central model security review; auditing performance of the first central model based on analysis of the plurality of second local models to generate audit metrics; updating the central model based on the audit metrics; and deploying the updated central model to a plurality of user devices.

The computer implemented method may comprise the digital data being obtained through an API. The computer implemented method may comprise the local data security review generating a set of edge thresholds; monitoring on the user device through a set of edge sensors, wherein the edge sensors filter data anomalies associated with the set of edge thresholds out of the first data set to generate a second data set which is a filtered portion of the first data set; identifying on the user device a malicious data set on the user device from the first set of data that failed a threshold analysis by the edge sensors; and reporting the threshold triggers associated with the malicious data set. The computer implemented method may comprise converting the first data set into a standardized format.

The computer implemented method may comprise auditing the performance of the first central model comprises at least one of failure mode and effects analysis (FMEA), security testing, and non-failure mode and effects analysis. The computer implemented method may comprise updating the first central model based on the aggregated audit metrics further comprises electronic design automation, feature engineering, training the model, evaluation of the model; wherein auditing and FMEA is conducted on the model during each of the steps of updating the central model. The computer implemented method may comprise registering an audited and finalized model; and receiving user input to evaluate the permission to update the local model.

The computer implemented method may comprise updating the first local model using at least one of failure modes and effects analysis (FMEA), smoke testing, checking the obtained data, and unit testing. The computer implemented method may comprise implementing a security system within the model training and data monitoring of the pipeline for adversarial attacks. The computer implemented method may comprise the central model receives differentiated data if a user provides a sharing permission. The computer implemented method may comprise training the second model on locally obtained data.

The computer implemented method may comprise the digital data may comprising at least one of dietary information, exercise and activity. The computer implemented method may comprise the physiology data comprising at least one of pulse, respiration rate, blood pressure, electrocardiogram, caloric expenditure, fetal kick counts, mental health, pain, bleeding, and contractions gathered over time at a first sampling frequency.

The computer implemented method may comprise the predictive inference being associated with pregnancy outcomes. The computer implemented method may comprise obtaining a pregnancy outcome metric by applying the first local model to the second data set. The computer implemented method may comprise providing an alert to at least one of a user and a healthcare practitioner based on the pregnancy outcome metric; wherein the healthcare practitioner comprises at least one of emergency medical services, a physician or practice associated with providing care for the user. The computer implemented method may comprise providing an alert by comparing the pregnancy outcome metric to a threshold, wherein the pregnancy outcome metric comprises an indication of a positive outcome or a negative outcome. The computer implemented method may comprise updating the central model by re-training the central model to predict pregnancy outcomes based on the aggregated local models.

The invention may comprise a computing system for edge device level security analytics, the computing system comprising: at least one computing processor; and memory comprising instructions that, when executed by the at least one computing processor, enable the computing system to: create a first local model on a user device by deploying a first central model to the user device, wherein the first central model is trained to analyze user data and provide at least one predictive inference; obtain, in near real-time, digital data associated with a user, the digital data obtained from the user device, the digital data associated with at least one of user physiology data and health data; generate a first data set from at least one of a portion of the obtained digital data; apply a local data security review to the first data set; filter the first data set to exclude data which fails the local data security review; generate a second data set by applying differential privacy techniques to the first data set based on the local data security review results; train a second local model using the second data set; apply a local model security review to the second local model; apply a central model security review to each local model received by a central model processing system; aggregate a plurality of second local models created across a plurality of user devices associated with a plurality of different users based on the central model security review; audit performance of the first central model based on analysis of the plurality of second local models to generate audit metrics; update the central model based on the audit metrics; and deploy the updated central model to a plurality of user devices.

The invention may comprise a non-transitory computer readable medium comprising instructions that when executed by a processor enable the processor to: create a first local model on a user device by deploying a first central model to the user device, wherein the first central model is trained to analyze user data and provide at least one predictive inference; obtain, in near real-time, digital data associated with a user, the digital data obtained from the user device, the digital data associated with at least one of user physiology data and health data; generate a first data set from at least one of a portion of the obtained digital data; apply a local data security review to the first data set; filtering the first data set to exclude data which fails the local data security review; generate a second data set by applying differential privacy techniques to the first data set based on the local data security review results; train a second local model using the second data set; apply a local model security review to the second local model; apply a central model security review to each local model received by a central model processing system; aggregate a plurality of second local models created across a plurality of user devices associated with a plurality of different users based on the central model security review; audit performance of the first central model based on analysis of the plurality of second local models to generate audit metrics; update the central model based on the audit metrics; and deploy the updated central model to a plurality of user devices.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
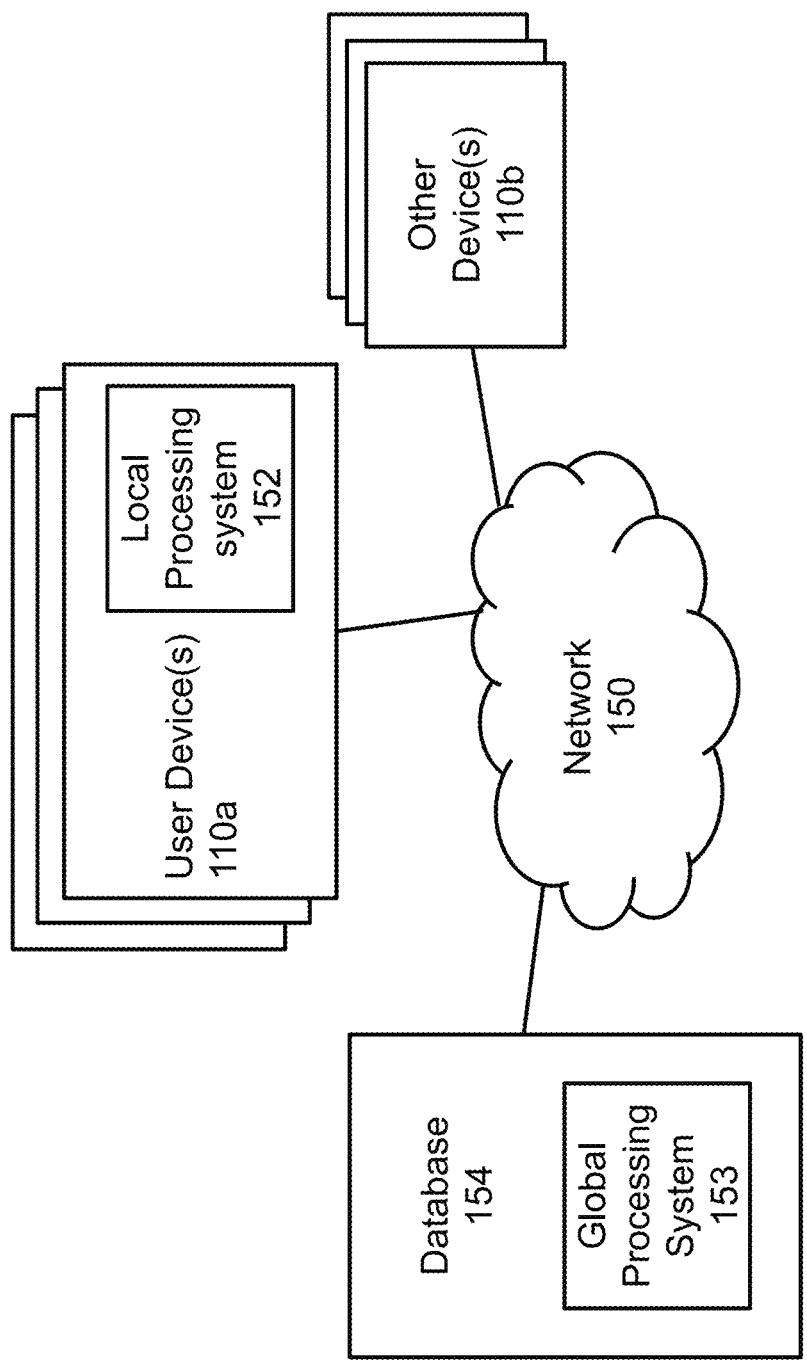
FIG. 1 illustrates a network diagram of an AI model management system in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an exemplary embodiment of an AI model management system according to one embodiment. The system includes User device(s) 110a (comprised of a local processing system 152), other device(s) 110b, a database 154 (comprised of a global processing system 153), and a network 150 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention. The depicted components are generally configured to operate as a cloud computing environment or part of a cloud computing environment.

User device(s) 110a may be an electronic device including hardware, software, or embedded logic components or a combination of two or more such components and capable of carrying out the appropriate functions implemented or supported by the user device 110a. For example and without limitation, a user device 110a may be a desktop computer system, a notebook computer system, a netbook computer system, a handheld electronic device, or a mobile telephone. The present disclosure contemplates any user device 110a. A user device 110a may enable a network user at the user device 110a to access network 150. A user device 110a may enable its user to communicate with other users at other user devices 110a. User device 110a is operable to obtain data from at least one of the other device(s) 110b. User device(s) 110a may obtain training data for use in training models to be used in evaluating real-time data obtained in association with at least one of the other device(s) User device 110a may be capable of alerting when potentially adverse conditions are detected (via alert engine), and intervention services when appropriate and/or requested (via intervention engine). User device(s) 110a may be a server, a desktop computer, a laptop computer, personal digital assistant (PDA), an in- or out-of-car navigation system, a smart phone or other cellular or mobile phone, or mobile gaming device, among other suitable computing devices. User devices 110a may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150

The other device(s) 110b may be used to improve the data set obtained and interpreted by the User device(s) 110a. The other device(s) 110b may comprise at least one of a training database, edge, survey database, and external stakeholders and provide monitoring related data associated with a user of each user device (via monitoring engine), such as data associated with monitoring user health. Other device 110b may comprise biometric devices which may include, generally, a computer or computing device including functionality for communicating (e.g., remotely) over a network 150. Data may be collected from other devices 110b, and data requests may be initiated from each user device 110a . . . .

A user device 110a may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110a may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110a one or more Hyper Text Markup Language (HTML) files responsive to the HTTP request. The user device 110a may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110a may also include an application that is loaded onto the user device 110a. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2A:
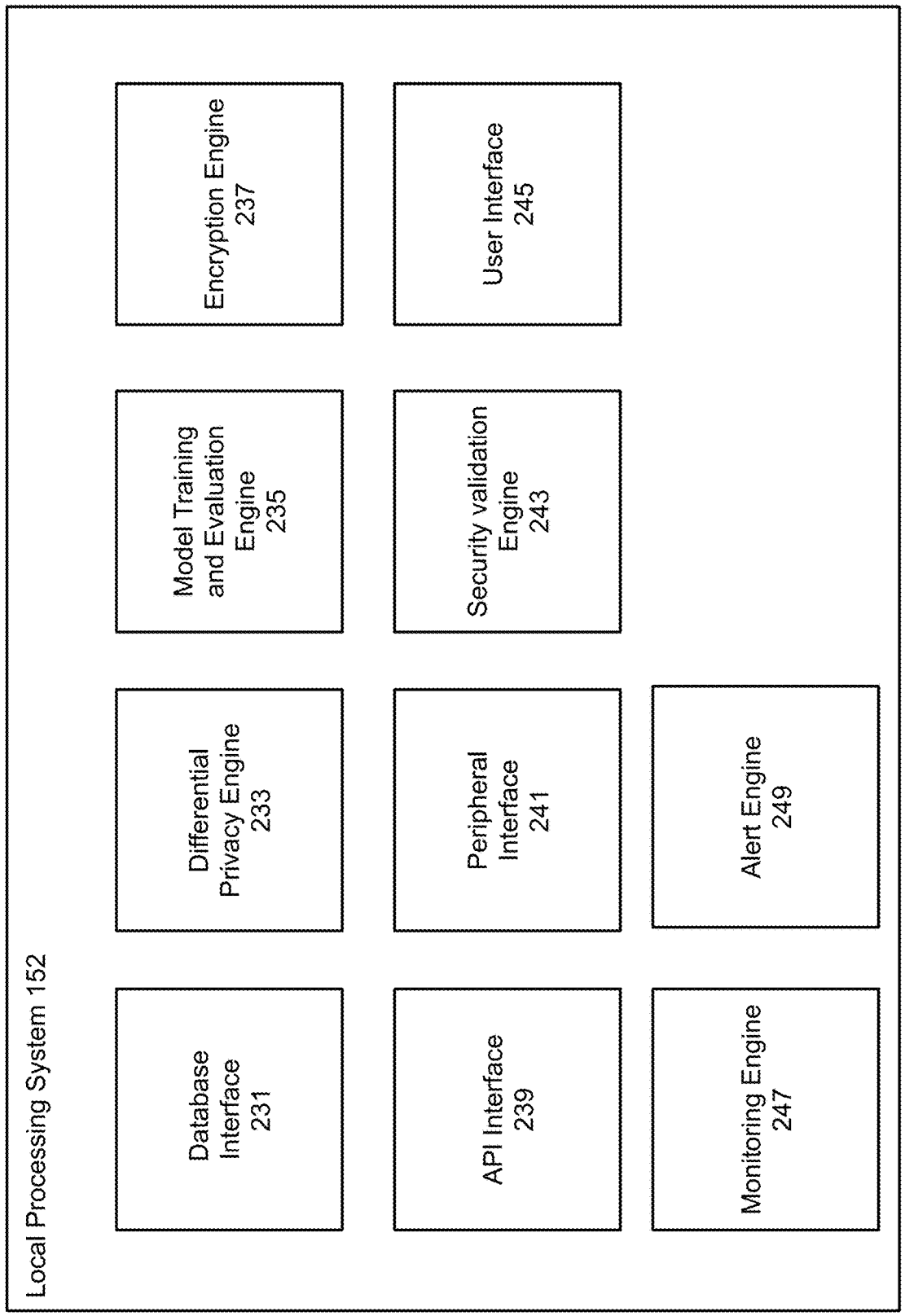
FIG. 2A illustrates a local model data processing system in accordance with an exemplary embodiment of the present invention.

FIG. 2a illustrates an exemplary embodiment of the local processing system 152. The local processing system 152 includes database interface 231, differential privacy engine 233, model training and evaluation engine 235, encryption engine 237, API interface 239, peripheral interface 241, security validation engine 243, user interface 245, monitoring engine 247, and alert engine 249. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met. The depicted components are generally configured to operate as a cloud computing environment or part of a cloud computing environment.

The database interface 231 may be used to communicate information over the network 150 to the other devices 110b and the database 154. The database interface 231 facilitates the storage, retrieval, and manipulation of data, ensuring efficient data management between the local processing system 152 and the global processing system 153. The Database interface 231 may comprise various elements such as data access layers, query builders, and connection pools, the database interface streamlines interactions with the underlying database infrastructure. Alternatively, other alternatives such as Object-Relational Mapping (ORM) frameworks or custom data access libraries may also be employed to interface with the database, offering flexibility and adaptability to different system architectures and requirements.

The differential privacy engine 233 may be used to protect user data through the use of differential privacy techniques.

The differential privacy engine 233 may assist the processing system 153 that sensitive information remains confidential and anonymized, even during data analysis and model training processes. The differential privacy engine 233 may be comprised of algorithms, privacy-preserving mechanisms, and noise injection modules, to add a layer of privacy protection by introducing controlled noise to query responses or aggregated data. Alternatively, other alternatives such as homomorphic encryption or secure multi-party computation may also be considered for privacy-preserving data analysis, providing alternative approaches to protect user privacy while still enabling meaningful insights to be derived from the data.

The model training and evaluation engine 235 may be used to improve and refine the local model on the user device 110*a*. The model training and evaluation engine 235 may comprise training data obtained from at least one source including, but not limited to, at least one of human studies sources, hospitals, insurance companies, external stakeholders such as those listed above, and historical and/or real-time data obtained via monitoring as described above. The obtained data may be used to train initial models as well as update training models over time as more data becomes available and the aggregated metadata changes over time.

The encryption engine 237 may be used to protect the user data on the user device 110*a* through various encryption techniques. The encryption engine 237 may comprise encryption algorithms, cryptographic libraries, and key management systems to encrypt data at rest and in transit. Through symmetric or asymmetric encryption methods, such as AES (Advanced Encryption Standard) or RSA (Rivest-Shamir-Adleman), the encryption engine safeguards user data from unauthorized access or interception by malicious actors. Other alternatives such as blockchain-based encryption or quantum-resistant cryptography may also be explored to enhance data security further The API interface 239 may be used to communicate data between the user device 110*a* and APIs present on other devices 110*b*. The API interface 239 may comprise authentication mechanisms, token generation modules, and secure communication protocols to establish encrypted channels for data exchange. Leveraging industry-standard encryption protocols like HTTPS (Hypertext Transfer Protocol Secure) or TLS (Transport Layer Security). Other alternatives such as OAuth (Open Authorization) or JWT (JSON Web Tokens) may be adopted to enhance authentication and authorization mechanisms, providing additional layers of security for user data The peripheral interface 241 may be used to communicate data between the user device 110*a* and peripheral made to gather information from exterior devices. These devices may send at least one of physiological data and may be or comprise a cloud based server for providing the associated data processing functionality. Local processing system 151 may aggregate data related to health to identify and/or recommend healthy practices and/or identify what is exposing individuals to adverse events (e.g. certain activities, lifestyle choices, etc.). In one aspect, the data may be related to pregnancy and identifying and/or recommending healthy practices related to pregnancy outcomes. The local processing system 151 may communicate with external stakeholders (such as non-profits, government organizations, healthcare organizations, insurance companies, academic institutions) to provide aggregated metadata for various purposes such as research, program development, and policy creation and/or refinement. Biometric device(s) may generally comprise at least one of sensors, smartwatches, other wearable sensing devices, and any sensing device operable to obtain data associated with biometric, physiology, and/or health related information associated with an individual. Biometric device(s) may communicate obtained information to at least one of local device 110*a* and network 150. Exemplary data which may be obtained includes, but is not limited to at least one of heart rate, oxygen saturation, EKG, temperature, and movement data. In one aspect data may be obtained via one or more apps on mobile device(s) 110*a* and/or biometric device(s), such as by scraping information from apps such as at least one of health data apps, dietary logging/tracking apps, activity/exercise tracking apps, and food ordering apps.

The security validation engine 243 may be used to identify and eliminate potentially harmful data from interacting with the model training and evaluation engine 235. The security validation engine 243 may comprise anomaly detection algorithms, data integrity checks, and threat assessment mechanisms to meticulously scrutinize incoming data streams for anomalies, irregularities, or suspicious patterns. Other alternatives such as intrusion detection systems, behavior analysis tools, or anomaly detection frameworks may also be employed to reinforce the security validation process, offering additional layers of protection against emerging threats and vulnerabilities The user interface 245 may be used to receive input from a user to the user device 110*a*. The user interface 245 may comprise at least one of a graphical user interfaces (GUIs), command-line interfaces (CLIs), and voice recognition systems, providing users with intuitive and accessible means to interact with the system. The user interface 245 may comprise user-friendly interfaces and input mechanisms, such as forms, buttons, and menus, the UI enables users to input various types of data, configure system settings, or initiate processing tasks. Alternatives such as natural language processing (NLP) interfaces or gesture-based interfaces may also be explored to enhance user experience and accessibility.

Monitoring engine 247 is operable to obtain health related data and/or process health related data using trained models to evaluate an individual's health status. In one aspect, the health status may be associated with pregnancy. Monitoring engine 247 may determine when obtained information satisfies certain conditions such as those indicative of an adverse event and/or trending towards a potentially adverse event. When such conditions are met, the alert engine 249 may be triggered to provide various alerts as described below.

Alert engine 249 is operable to obtain an indication from monitoring engine 247 of an adverse (or potentially adverse) event. Alert engine 249 may obtain the relevant information associated with the indication of the adverse or potentially adverse event. Alert engine 249 may notify at least one of the individual associated with the adverse event (i.e. end user of the user device 110*a*), a healthcare professional, and emergency medical services. Alert engine 249 is operable to provide interventional assistance to end users. In one aspect, alert engine 249 may provide interventional assistance to pregnant individuals throughout a pregnancy monitoring process. In one aspect, alert engine 249 is operable to connect clinicians (e.g. physicians, nurses, etc.) with end users upon detection of an adverse event. In one aspect, alert engine 249 is operable to connect end users with a clinician at the request of the end user, such as when the end user is seeking advice on a health related matter or has a health related concern (e.g. pregnancy related matters or concerns).

Figure 2B:
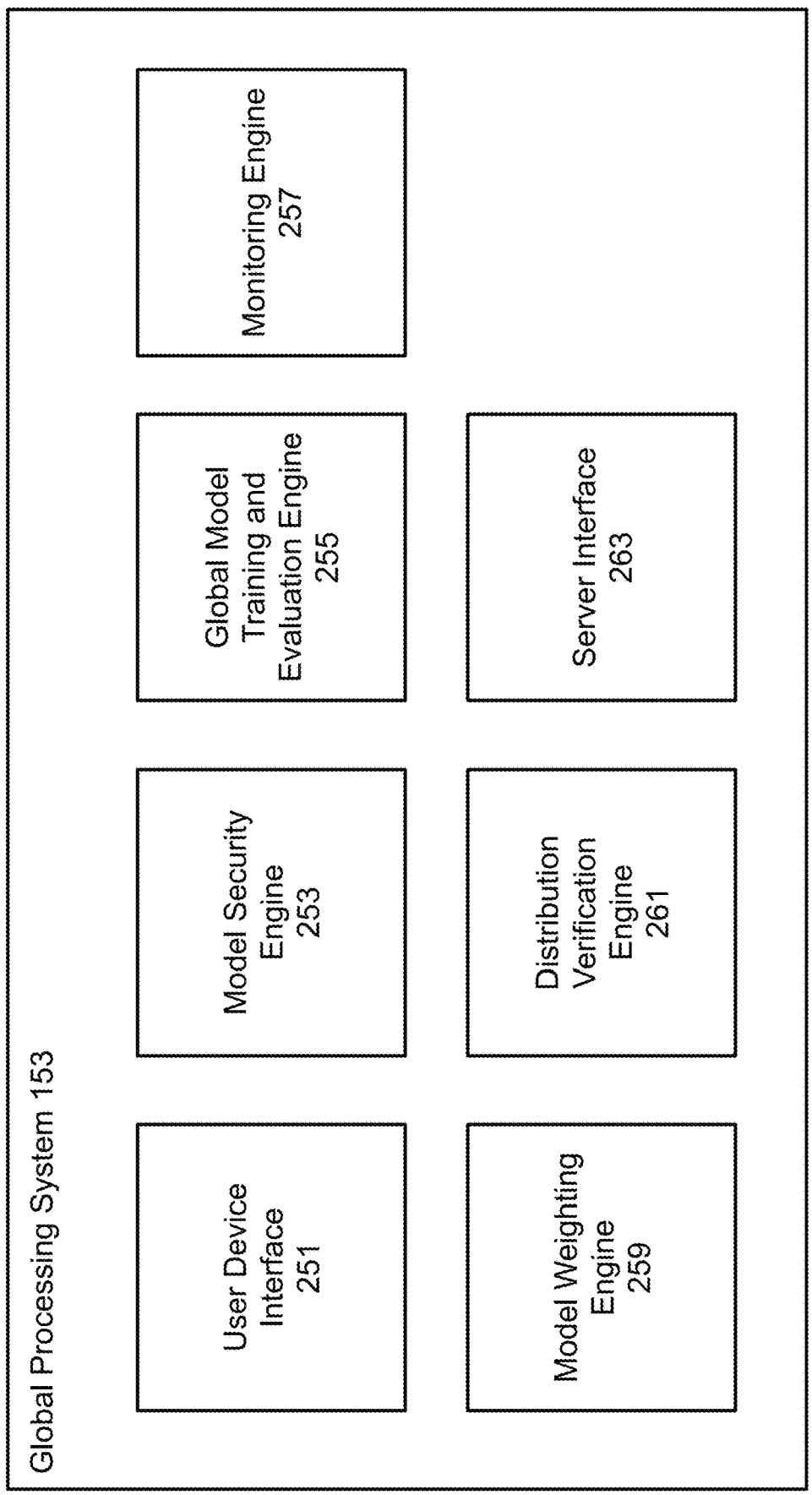
FIG. 2B illustrates a global model data processing system in accordance with an exemplary embodiment of the present invention.

FIG. 2b illustrates an exemplary embodiment of the global processing system 153. The global processing system 153 includes user device interface 251, model security engine 253, Global Model Training and Evaluation Engine 255, monitoring engine 257, model weighting engine 259, distribution verification engine 261, and server interface 263. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met. The depicted components are generally configured to operate as a cloud computing environment or part of a cloud computing environment.

The user device interface 251 may be used to communicate information over the network 150 to the user device 110a and other devices 110b. The user device interface 251 facilitates the storage, retrieval, and manipulation of data, ensuring efficient data management between the global processing system 153 and the local processing system 152. The user device interface 251 may comprise various elements such as data access layers, query builders, and connection pools, the database interface streamlines interactions with the underlying database infrastructure. Alternatively, other alternatives such as Object-Relational Mapping (ORM) frameworks or custom data access libraries may also be employed to interface with the database, offering flexibility and adaptability to different system architectures and requirements.

The model security engine 253 may allow the global processing system 153 to evaluate any security breaches and to ensure security of the models and data held by the database 154. Any models or data found to be outside of normal thresholds may be flagged and the user information may be added to the database 154 to ensure future data or models are not imported through an untrusted source.

The global model training and evaluation engine 255 may allow the global processing system 153 to update the global models based upon data received from the user devices 110a. The global model training and evaluation engine 255 may obtain information from at least one user device 110a and test and train the global models from the obtained data. In an embodiment the information obtained may comprise anonymized model results from user devices 110a and not contain actual user data. The global model training and evaluation engine 255 may utilize at least one of supervised learning, unsupervised learning, reinforcement learning, transfer learning, semi-supervised learning, and self-supervised learning.

The monitoring engine 257 may allow the global processing system 153 to monitor the model integrity of the various models held in the database 154. The auditing provided by the monitoring engine 257 may occur throughout the training and development of the model. The audit may comprise failure modes and effects analysis and other known techniques in the art.

The model weighting engine 259 may allow the global processing system 153 to apply weights to the effectiveness of the various models obtained from the user devices 110a. The model weighting engine 259 may employ weighting techniques that include but are not limited to Equal weighting, Uniform averaging, Voting, Confidence weighting, Accuracy weighting, Diversity-based weighting, Adaptive weighting, and Meta-learning The distribution verification engine 261 may allow the global processing system 153 to consistently verify the integrity of the models sent to the various user devices 110a. Model degradation checks, and smoke tests may be applied to the various models to ensure that they are functioning within appropriate bounds. Approval by a human reviewer may also be prompted by this engine before sending and approving new models.

Figure 3A:
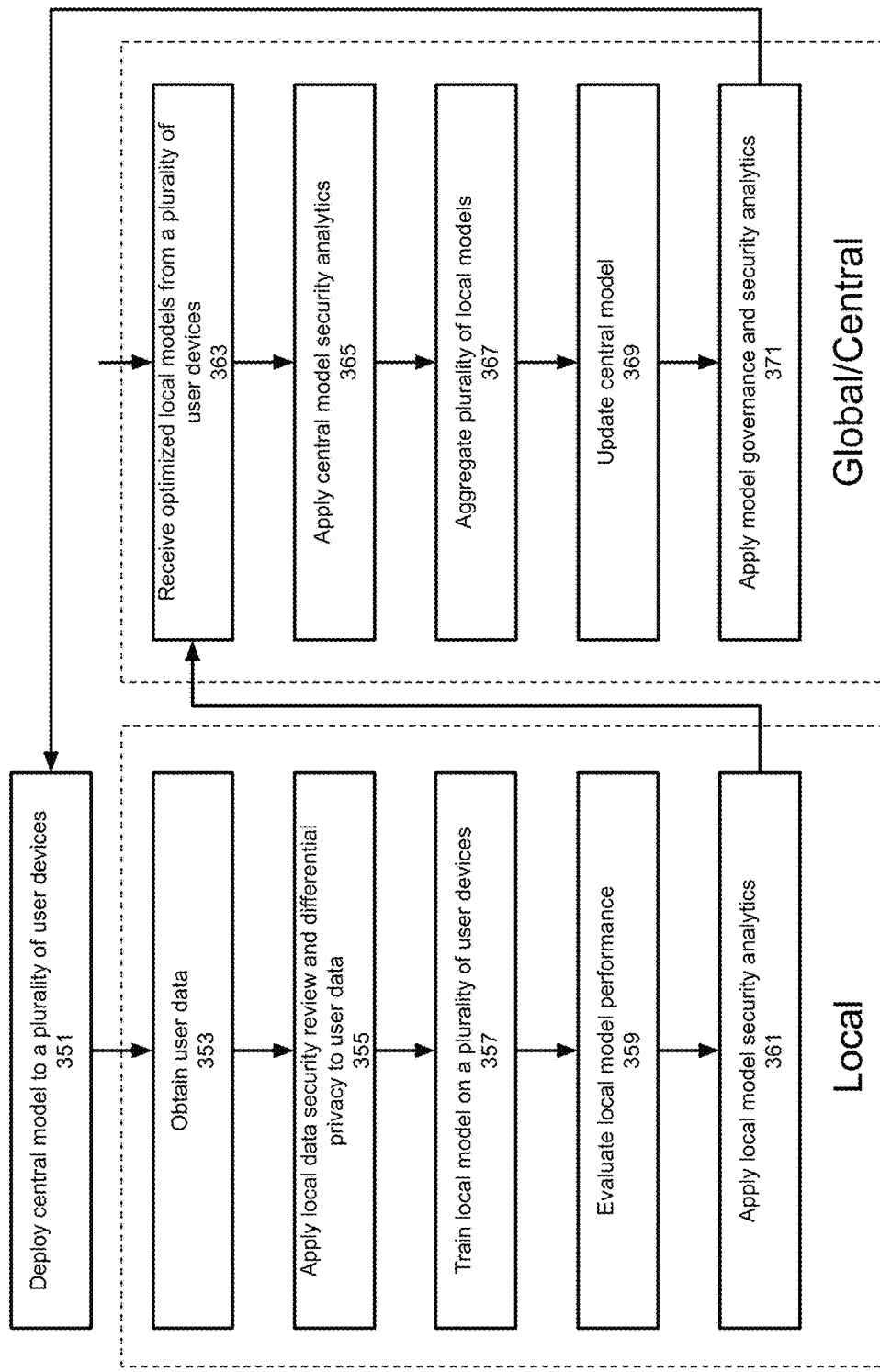
FIG. 3A-F illustrate an exemplary process for training, evaluating and deploying AI trained models according to one embodiment of the invention.

The server interface 263 may allow the global processing system 153 to communicate with a server to hold the data and models developed by the global processing system 153. The server interface 263 may comprise various elements such as database connectors, query builders, and data access layers, enabling efficient interaction with the underlying database infrastructure. Through standardized protocols and APIs, The server interface 263 allows the global processing system 153 to retrieve, store, and manipulate data stored in the electronic database. Alternatives such as object-relational mapping (ORM) frameworks or custom data access libraries may also be utilized to interface with the database, providing flexibility and adaptability to different system architectures and database technologies FIG. 3A illustrates an exemplary process for AI model management according to one embodiment of the invention. The process comprises deploying a central model to a plurality of user devices 351, obtaining user data 353, applying local data security review and differential privacy techniques 355, training a local model on each user device 357, evaluating each local model's performance 359, applying local model security analytics 361, receiving optimized local models 363, applying central model security analytics 365, aggregating a plurality of local models 367, updating a central model 369, and applying model governance and security analytics 371. In one aspect, steps 353, 355, 357, 359 and 361 may all be performed locally on or in association with a user device. In one aspect, steps 363, 365, 367, 369 and 371 may all be performed globally on or in association with a central server. The process may comprise additional steps, fewer steps, and/or a different order of steps without departing from the scope of the invention as would be apparent to one of ordinary skill in the art.

At 351 the process may comprise deploying a central model to a plurality of user devices. Deploying a central model may comprise creating a local model on each of a plurality of user devices. Deploying a central model may comprise deploying a central model to a plurality of user devices associated with different users. The central model may comprise a previously trained model. The central model may be deployed from a central server. The central model may comprise a plurality of central models each trained on different training data and/or each trained to analyze different input data.

At 353 the process may comprise obtaining user data. User data may comprise digital data associated with a user associated with the user device. The user data may comprise user data associated with physiology data such as data obtained from a wearable device such as a smartwatch. The user data may comprise user data associated with user reported data such as data provided through a smartphone such as user reported health data, exercise data, diet data, mood data and the like. The user data may be obtained in real-time or near real-time. The obtained user data may be used to generate at least one first data set. The at least one first data set may comprise at least one of a subset of all obtained user data, a combination of different portions of the obtained data (including different types of data), and all of the obtained user data.

At 355 the process may comprise applying local data security review and differential privacy techniques to the obtained user data. Local data security review may comprise analysis of the obtained data to identify malicious data which could affect the integrity of the models. Applying a local data security review may comprise filtering the obtained data or a portion thereof (e.g. the first data set) to exclude data which fails the local data security review. When data fails the local data security review, the corresponding data may be flagged and a data security incident response or log may be generated. Applying differential privacy techniques may comprise removing or otherwise altering data which could be used to identify the user associated with the data. A second data set may be generated by applying differential privacy measures to the obtained data and/or the obtained data filtered in accordance with the security review thereby providing data which can be used in model training with minimized risk of that data being able to be associated with the user from whom it was obtained.

At 357 the process may comprise training a local model on at least one user device. The local model may be trained using the user data obtained on that user device. A local model may be trained for each user device using the data obtained in association with the corresponding data. The local model may be trained using only data that has passed a data security review. The local model may be trained using only data that has undergone differentially privacy processing.

At 359 the process may comprise evaluating local model performance. Each locally trained model may be evaluated on its local performance. The locally trained model may be used to analyze newly obtained user data based on training performed on previously obtained user data. Each locally trained model may undergo local iterative retraining until an optimal local model has been achieved. An optimal model may be determined by comparing model performance to a threshold and determining that the model meets or exceeds the threshold.

At 361 the process may comprise applying local model security analytics. The local security analytics may be applied to the optimal model to ensure the model meets appropriate security standards. When the model fails to meet the necessary security requirements, the corresponding model may be flagged and a model (or data) security incident response or log may be generated. When the model passes the security review (i.e. meets the security requirements), the optimal local model may be transmitted to the central server for use in updating a global or central model.

At 363 the process may comprise receiving optimized local models. Receiving optimized local models may comprise receiving, at a central server, a plurality of optimal models from a plurality of user devices. The optimal models may be the result of iterative retraining of a local model using locally obtained user data. The optimal models may be the result of iterative retraining initiating with the same central model deployed to a plurality of user devices, subsequent updated versions of the central model, and/or a newly trained and deployed central model.

At 365 the process may comprise applying central model security analytics. The central model security analytics may review each incoming optimal model, alone and/or in combination, to ensure the incoming models meet appropriate security requirements. When incoming optimal models satisfy the security requirements, the models can be used in further analysis to update or retrain an existing central model or develop a new central model. When the incoming the models fail to meet the necessary security requirements, the corresponding model may be flagged and a model (or data) security incident response or log may be generated.

At 367 the process may comprise aggregating a plurality of local (optimal) models. Aggregating may comprise aggregating the model weights across a plurality of received models in order to generate new model weights (e.g. a new weight matrix) for use in the central model. Various approaches may be used in aggregating the model weights including, but not limited to, at least one of lookahead optimization, federated averaging, statistical factors (e.g means across a plurality of received models), and the like.

At 369 the process may comprise updating a central model. Updating a central model may comprise applying the updated model weights as derived from the aggregation. Prior to updating the central model, the updated model weights may undergo a security review in the form of a data distribution check. When the updated model weights fail the data distribution check, the corresponding weights and/or data may be flagged and a model (or data) security incident response or log may be generated. When the data distribution check passes, the updated model weights may be applied to update the central model on the central server.

At 371 the process may comprise applying model governance and security analytics 371. Model governance and security analytics may be applied prior to deploying or redeploying the central model. Model governance and security analytics may comprise evaluating the updated central model for model degradation and/or comparing the model against security thresholds. When the updated model fails the degradation and/or security threshold analysis, the corresponding model may be flagged and a model (or data) security incident response or log may be generated. When the updated model passes the model degradation and security analysis, the updated model may be further analyzed to determine suitability for deployment. This may comprise at least one of failure modes and effects analysis (FMEA), smoke testing, checking the data used in updating the model, and unit testing. Once additional analytics and testing are satisfactory, the updated model may be designated for deployment through a gated approval approach. Once deployed the process may repeat. Deployment of the updated model may comprise redeployment of the model to users and corresponding user devices to which a previous version of the model had been deployed. Deployment of the updated model may comprise deployment of the model to new users and corresponding new user devices to which a previous version of the model had not been deployed. The process may return to 351, wherein deployment results in the creation of a plurality of new local models which can be subsequently used in monitoring of newly acquired user data, undergo local training and/or used in the iterative process of repeatedly updating the central model.

Figure 3B:
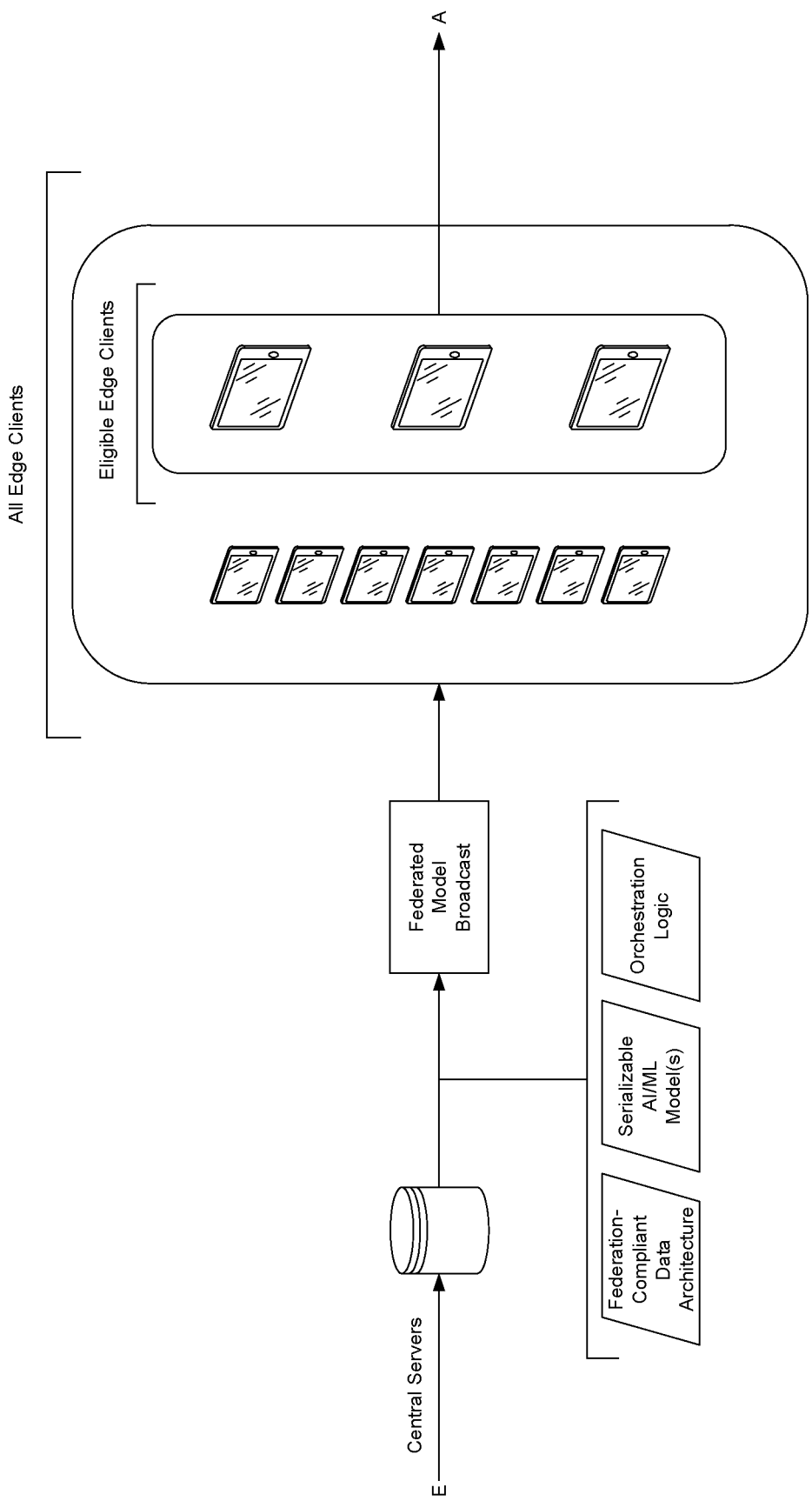
Figure 3C:
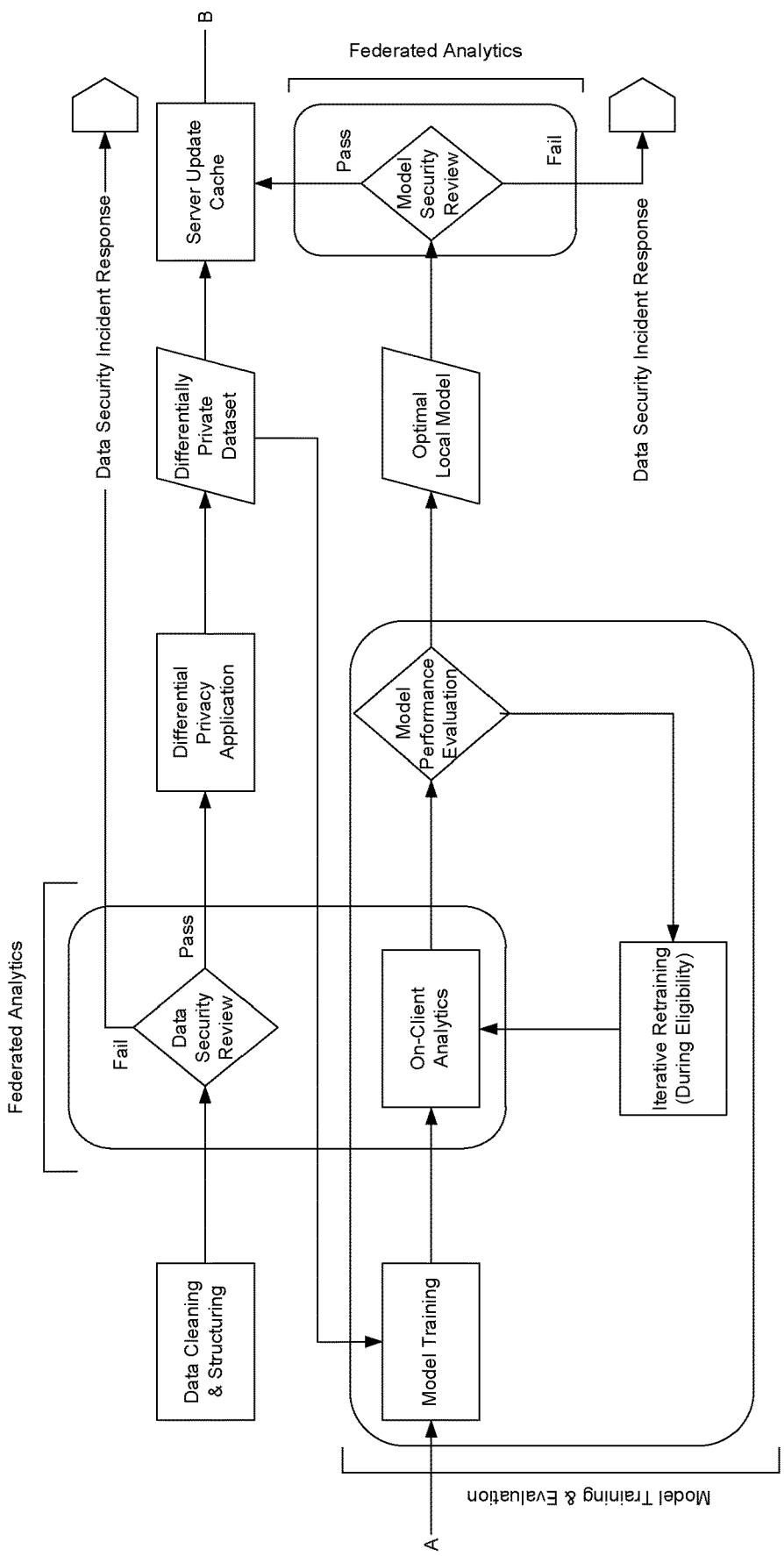
Figure 3D:
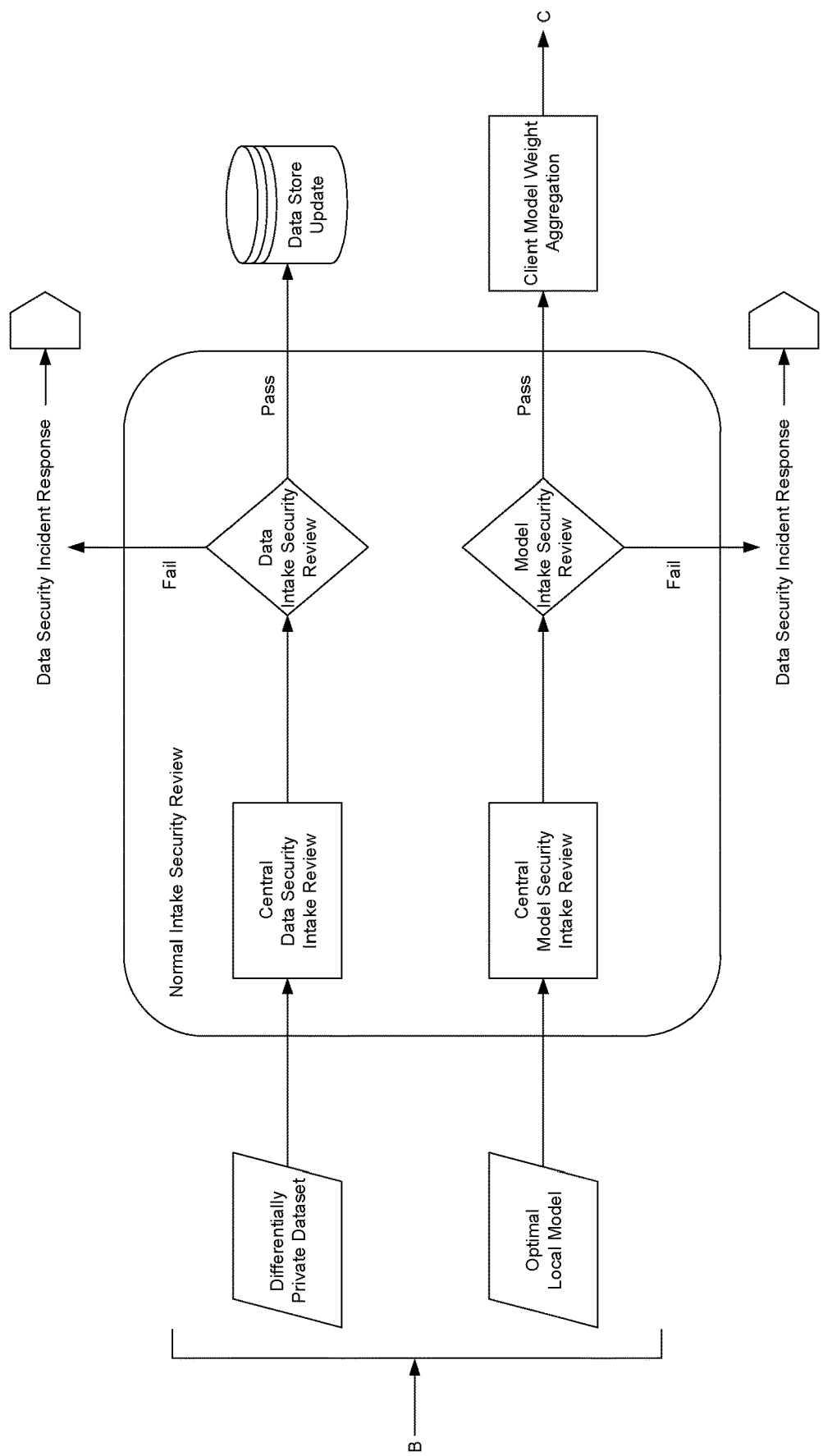
Figure 3E:
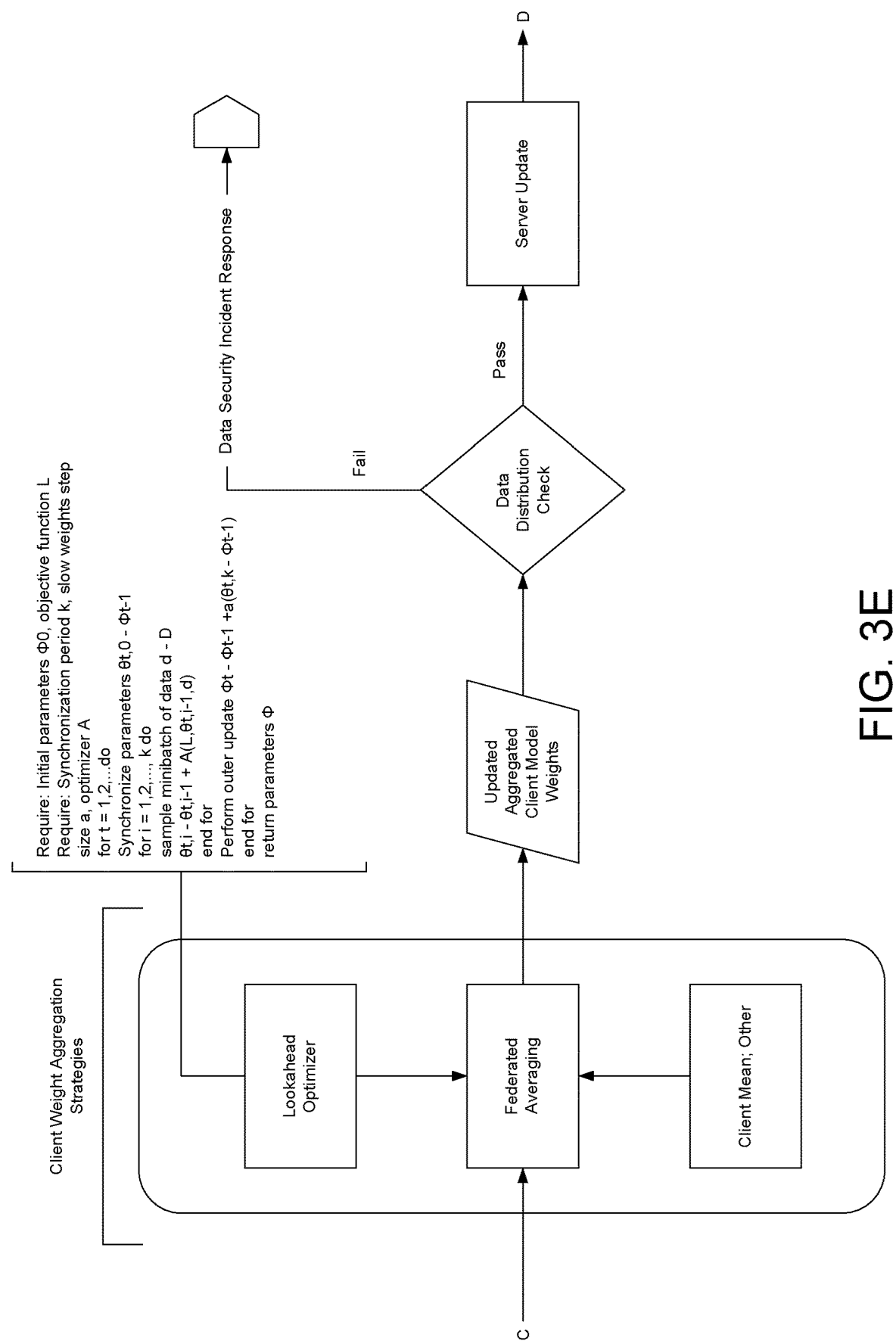
Figure 3F:
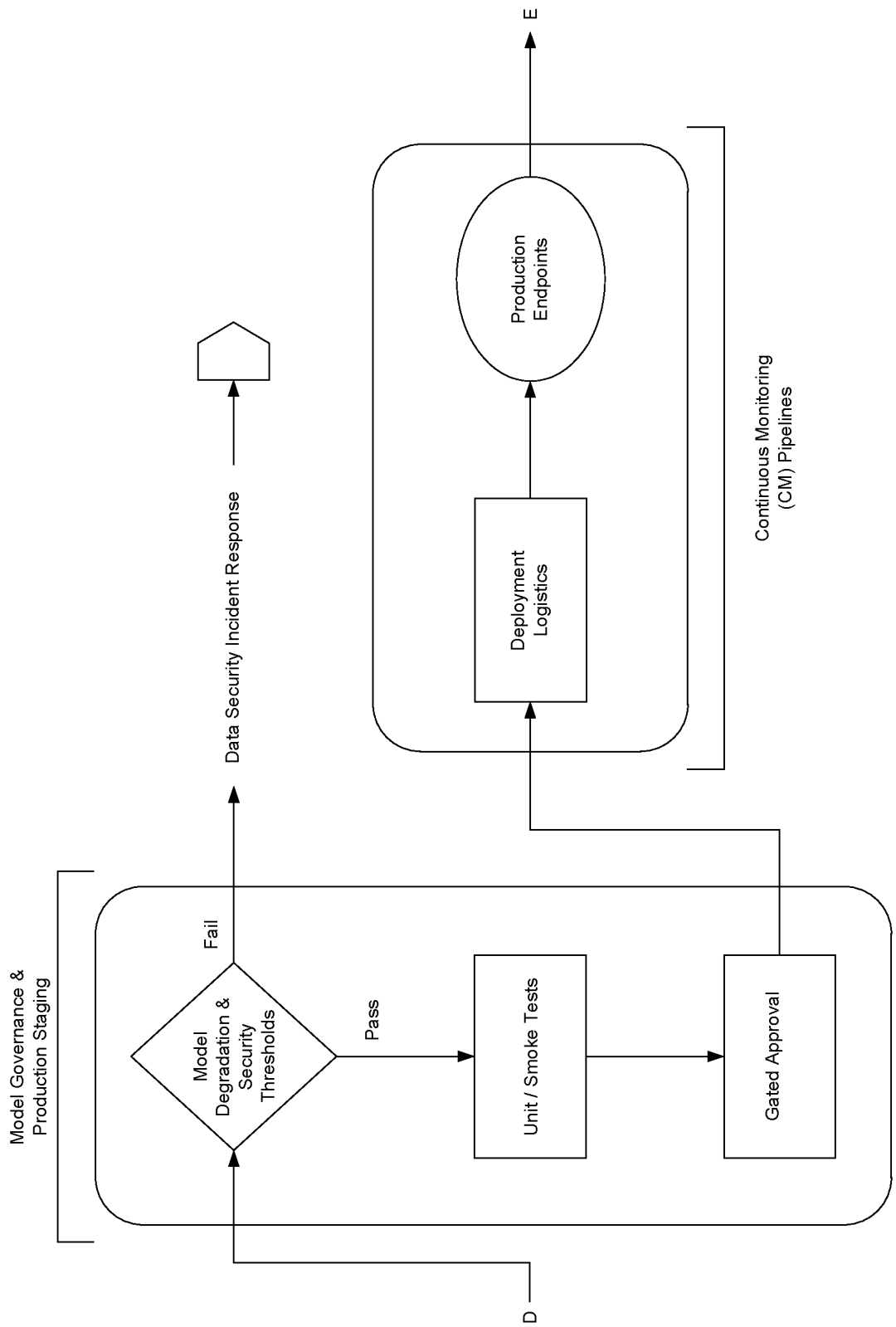

FIG. 3B-3F illustrate one exemplary embodiment of the above process for AI model management. In FIG. 3B, the central model may be deployed from a central server to a plurality of edge clients (e.g. user devices). Some of the edge clients may be designated as "eligible" edge clients indicating they are at least one of associated with model training, model evaluation, and providing user data to central server for use in model training. In one aspect, a designation of "eligible" is associated with an indication that the user provided data and/or model sharing permission. FIG. 3C depicts the data and model processing occurring at the local, user device level and corresponding data and/or model security analytics applied to improve the integrity of the central model by preventing the transmission of malicious data and/or models to the central server. FIG. 3D depicts the intake of data and/or models from user devices and the intake security measures applied prior to allowing the data and/or models to be used in updating or training of a central model. FIG. 3E illustrates model aggregation techniques applied to a plurality of received locally trained and/or optimized models and corresponding security analytics employed prior to updating and/or deploying the central model. FIG. 3F illustrates model governance, production staging, and deployment approaches to facilitate maintaining model integrity.

Figure 3G:
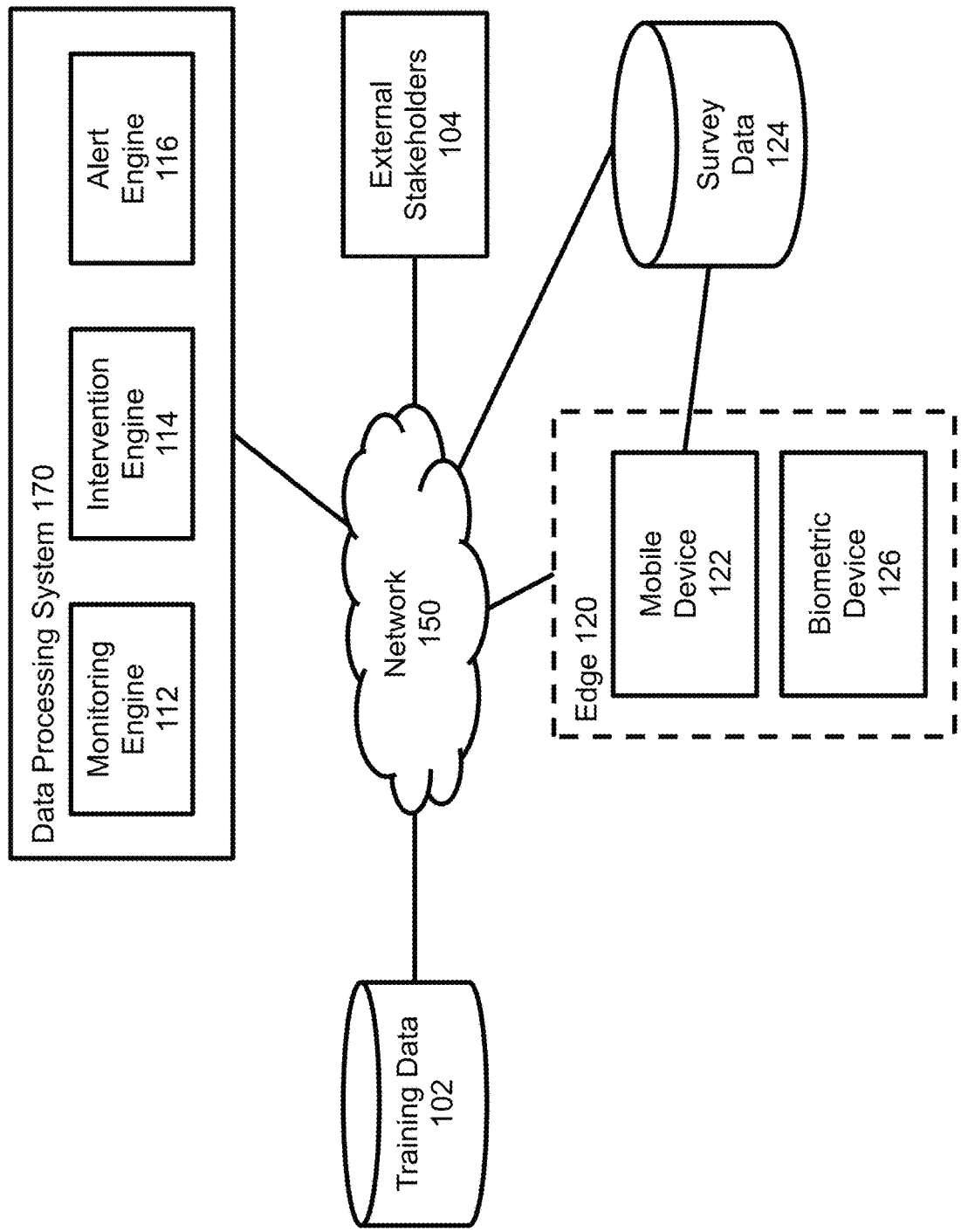
FIG. 3G illustrates an exemplary embodiment of a pregnancy health monitoring system in accordance with an exemplary embodiment of the invention.
Figure 3H:
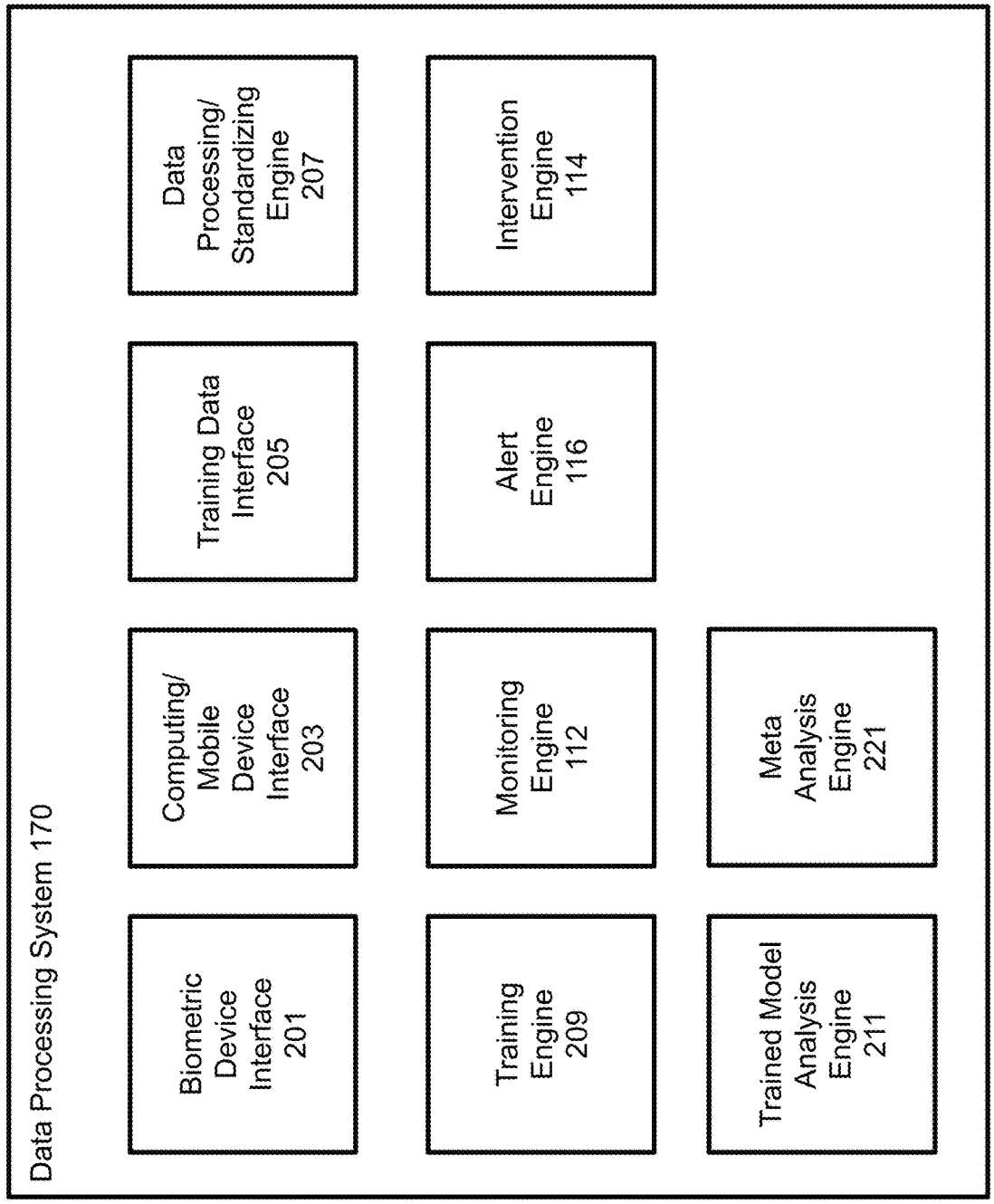
FIG. 3H illustrates an exemplary embodiment of a pregnancy health data processing system in accordance with an exemplary embodiment of the present invention.
Figure 3I:
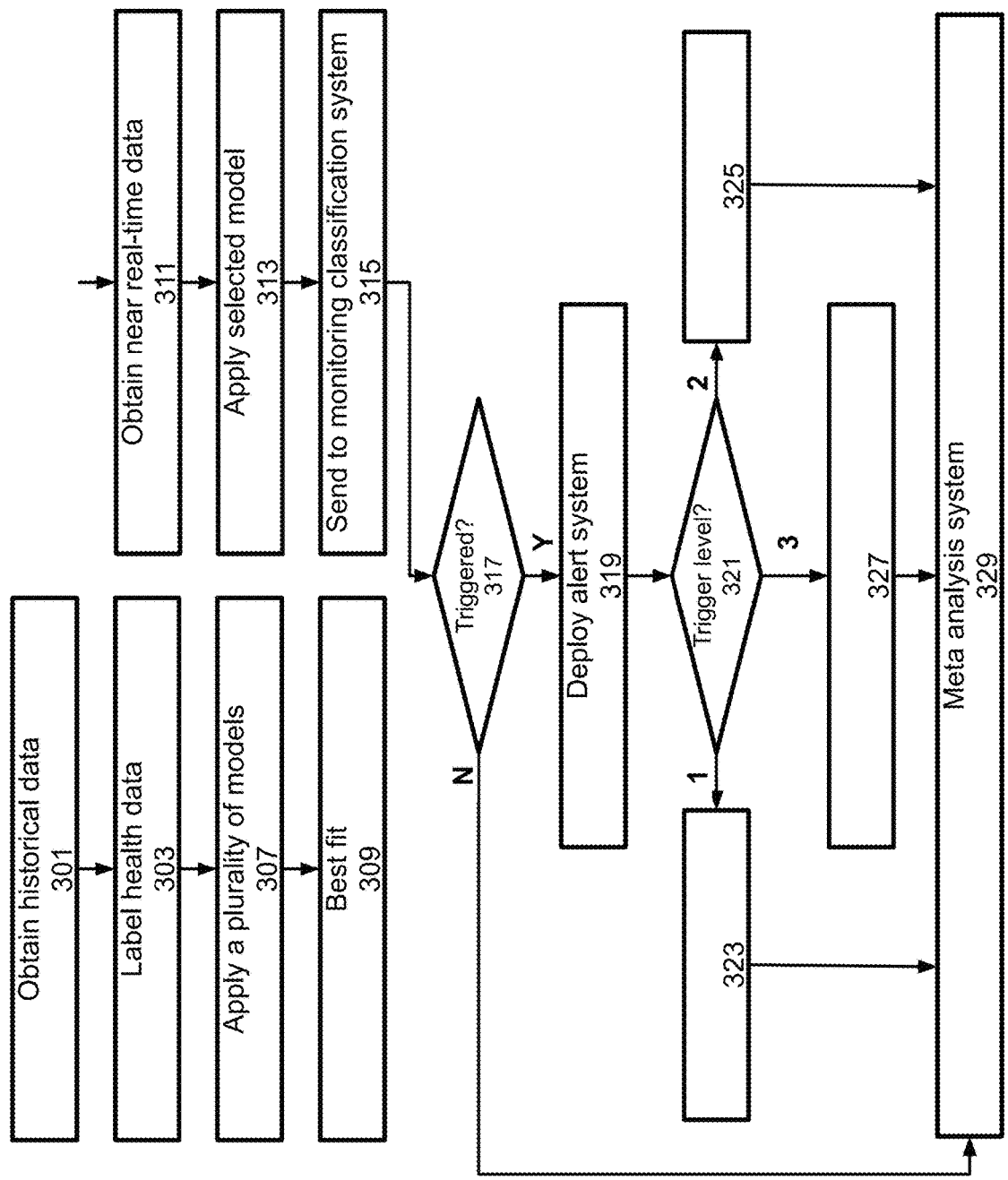
FIG. 3I illustrates an exemplary embodiment of process for training and applying models for monitoring pregnancy health according to one embodiment of the invention.

FIGS. 3G-3I illustrate an exemplary application of the above model management approaches to the field of pregnancy monitoring and outcome prediction.

FIG. 3G illustrates an exemplary embodiment of a pregnancy health monitoring system according to one embodiment. The system includes data processing system 170 (comprised of monitoring engine 112, intervention engine 114, and alert engine 116), edge 120 (comprised of mobile device 122 and biometric device 126), training data 102, survey data 124, external stakeholders 104, and a network 150 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention. The depicted components are generally configured to operate as a cloud computing environment or part of a cloud computing environment.

Data processing system 170 is operable to obtain data from at least one of training database 102, edge 120, survey database 124, and external stakeholders 104 and provide at least one of health monitoring related to pregnancy (via monitoring engine 112), alerting when potentially adverse conditions are detected (via alert engine 116), and intervention services when appropriate and/or requested (via intervention engine 114). Data processing system 170 may obtain training data for use in training models to be used in evaluating real-time data obtained in association with at least one of the monitoring engine 112, alert engine 116, and intervention engine 114. Data processing system 170 may be or comprise a cloud based server for providing the associated data processing functionality. Data processing system 170 may aggregate data on pregnancy related health to identify and/or recommend healthy practices and/or identify what is exposing individuals to adverse events (e.g. certain activities, lifestyle choices, etc.). Data processing system 170 may communicate with external stakeholders (such as non-profits, government organizations, healthcare organizations, insurance companies, academic institutions) to provide aggregated metadata for various purposes such as research, program development, and policy creation and/or refinement.

Monitoring engine 112 is operable to obtain health related data from at least one of edge 120 and survey database 124 and/or process health related data using trained models to evaluate an individual's health status associated with pregnancy. Monitoring engine 112 may determine when obtained information satisfies certain conditions such as those indicative of an adverse event and/or trending towards a potentially adverse event. When such conditions are met, the alert engine 116 may be triggered to provide various alerts as described below.

Alert engine 116 is operable to obtain an indication from monitoring engine 112 of an adverse (or potentially adverse) event. Alert engine 116 may obtain the relevant information associated with the indication of the adverse or potentially adverse event. Alert engine 116 may notify at least one of the individual associated with the adverse event (i.e. end user of the mobile device 122 and/or biometric device 126), a healthcare professional, and emergency medical services.

Intervention engine 114 is operable to provide interventional assistance to end users (e.g. pregnant individuals) throughout a pregnancy monitoring process. In one aspect, intervention engine 114 is operable to connect clinicians (e.g. physicians, nurses, etc.) with end users upon detection of an adverse event. In one aspect, intervention engine 114 is operable to connect end users with a clinician at the request of the end user, such as when the end user is seeking advice on a pregnancy related matter or has a pregnancy related concern.

Training database 102 may comprise training data obtained from at least one source including, but not limited to, at least one of human studies sources, hospitals, insurance companies, external stakeholders such as those listed above, and historical and/or real-time data obtained via monitoring as described above. The obtained data may be used to train initial models as well as update training models over time as more data becomes available and the aggregated metadata changes over time.

Edge 120 comprises at least one of mobile device(s) 122 and biometric device(s) 126 operable to obtain pregnancy related information associated with an individual. Mobile device(s) may be operable to communicate with biometric device(s) 126. Mobile device(s) may be operable to at least partially process data obtained from biometric device(s) 126 prior to providing the data to network 150. Mobile device(s) 122 may generally comprise smartphones, tablets and the like. Mobile device(s) 122 may be used to provide responses to questionnaires or surveys which may be communicated to network 150 and/or survey database 124. Biometric device(s) 126 may generally comprise at least one of sensors, smartwatches, other wearable sensing devices, and any sensing device operable to obtain data associated with biometric, physiology, and/or health related information associated with an individual. Biometric device(s) 126 may communicate obtained information to at least one of mobile device(s) 122 and network 150. Exemplary data which may be obtained includes, but is not limited to at least one of heart rate, oxygen saturation, EKG, temperature, and movement data. In one aspect data at edge 120 may be obtained via one or more apps on mobile device(s) 122 and/or biometric device(s) 126, such as by scraping information from apps such as at least one of health data apps, dietary logging/tracking apps, activity/exercise tracking apps, and food ordering apps.

Mobile device and biometric device 126 may be more generally referred to as user device(s) which may include, generally, a computer or computing device including functionality for communicating (e.g., remotely) over a network 150. Data may be collected from user devices 122, 126, and data requests may be initiated from each user device 122, 126. User device(s) 122, 126 may be a server, a desktop computer, a laptop computer, personal digital assistant (PDA), an in- or out-of-car navigation system, a smart phone or other cellular or mobile phone, or mobile gaming device, among other suitable computing devices. User devices 122, 126 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 122, 126 may be an electronic device including hardware, software, or embedded logic components or a combination of two or more such components and capable of carrying out the appropriate functions implemented or supported by the user device 122, 126. For example and without limitation, a user device 122, 126 may be a desktop computer system, a notebook computer system, a netbook computer system, a handheld electronic device, or a mobile telephone. The present disclosure contemplates any user device 122, 126. A user device 122, 126 may enable a network user at the user device 122, 126 to access network 150. A user device 122, 126 may enable its user to communicate with other users at other user devices 122, 126.

A user device 122, 126 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 122, 126 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 122, 126 one or more Hyper Text Markup Language (HTML) files responsive to the HTTP request. The user device 122, 126 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 122, 126 may also include an application that is loaded onto the user device 122, 126. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

FIG. 3H illustrates an exemplary embodiment of the data processing system 170. The data processing system 170 includes biometric device interface 201, computing/mobile device interface 203, training data interface 205, data processing/standardization engine 207, training engine 209, trained model analysis engine 211, monitoring engine 112, alert engine 116, intervention engine 114, and meta analysis/recommendation engine 221. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met. The depicted components are generally configured to operate as a cloud computing environment or part of a cloud computing environment.

Biometric device interface 201 is operable to obtain data from biometric device(s), such as biometric device(s) 126 described above. The obtained data may comprise at least one of biometric, physiology, and/or health related information associated with an individual. The obtained data may comprise data associated with at least one of heart rate, oxygen saturation, EKG, temperature, and movement data. The obtained data may comprise raw sensor data and/or data pre-processed by the biometric device and converted into health related metrics such as those listed above.

Computing/mobile device interface 203 is operable to obtain data from computing or mobile devices, such as device(s) 122 described above. The obtained data may comprise at least one of data from biometric device(s) which is relayed through mobile device(s) and/or pre-processed by mobile device(s). The obtained data may comprise questionnaire or survey data obtained via user responses provided via mobile and/or computing devices.

Training data interface 205 is operable to obtain training data for use in training models for evaluating pregnancy health related data. Training data may comprise pregnancy related data obtained from at least one of biometric device(s), computing/mobile device(s), survey data, and health information databases (such as human studies data, insurance company data, emergency medical services data, hospital data, etc.). Training data may be updated over time as new data becomes available, such as via ongoing monitoring via biometric and/or mobile devices and/or new health information databases. The training data may comprise labeled training data. Training data may comprise at least one of medical records based data, diet and nutrition data, and biometric/sensor data. Some exemplary data which may be used for training purposes, includes, but is not limited to, at least one of age, weight, body type, medical status/history (including mental health status/history), cholesterol, oxygen saturation, average heart rate, geographic location/region, education level, income, number of previous pregnancies, number of spontaneous abortions (or miscarriages or pregnancy loss), elected abortions, term, premature births, previous C-sections, diabetic status, etc.

Data processing/standardization engine 207 is operable to obtain data from a plurality of sources and pre-process the data for further use by other components, including converting the data to a standardized format for further use. The obtained data may come from a plurality of different sources (e.g. different biometric devices, different mobile devices, different databases) which may not provide the data in the same format. Data processing/standardization engine 207 converts the data having different formats into a standardized format such that further analysis of the data may proceed in a seamless manner.

Training engine 209 is operable to train at least one model for use in evaluating pregnancy related health information. Training may comprise at least one of cleaning, labeling, and formatting the training data such that the data is suitable training purposes. Training may comprise the use of artificial intelligence such as machine learning, neural networks, and/or deep learning. Training of a new model is generally done in a processor using training data and an appropriate algorithm. Such algorithms may comprise supervised learning, unsupervised learning, reinforcement learning, classification algorithms, or the like. Training may comprise use of at least one of linear regression and decision trees. Any number of algorithms, artificial intelligence, and machine learning techniques may be applied without departing from the scope of the invention.

Trained model analysis engine 211 is operable to evaluate the trained models and identify the best model for a given application or scenario. Trained model analysis engine 211 may determine the best model for a given application or scenario based on a best fit analysis. Trained model analysis engine 211 may evaluate newly trained models over time to identify changes in the best model for a given application or scenario. Trained model analysis engine 211 may determine different models to be used for different circumstances and the corresponding data obtained in association with those circumstances.

Monitoring engine 112 is operable to apply at least one trained model to evaluate data obtained in real-time or near real-time via at least one of biometric device interface 201 and computing/mobile device interface 203. Monitoring engine 112 may apply one or more models as determined by trained model analysis engine 211. Monitoring engine 112 may apply different models depending on the source and/or type of obtained data to be analyzed. When a model applied to the obtained data indicates an adverse or potentially adverse condition or event, monitoring engine 112 may trigger at least one of alert engine 116 and intervention engine 114 to engage additional functions aimed at managing pregnancy complications. A non-exhaustive list of exemplary characteristics which may be monitored via monitoring engine 112 includes, but is not limited to, oxygen saturation, body temperature, heart rate, heart rhythm (e.g. EKG characteristics), blood pressure, preeclampsia biometric signatures, etc.

Alert engine 116 is operable to obtain an indication from monitoring engine 112 of an adverse (or potentially adverse) event. Alert engine 116 may obtain the relevant information associated with the indication of the adverse or potentially adverse event. Alert engine 116 may notify at least one of the individual associated with the adverse event (i.e. end user of the mobile device 122 and/or biometric device 126), a healthcare professional, and emergency medical services. Alert engine 116 may provide a plurality of alert levels depending on the nature of the adverse event. For example, one alert level may comprise a recommendation to an end user (e.g. a pregnant individual) to contact their physician regarding the detected adverse event. Such an alert may be communicated to an end user via edge 120 (e.g. at least one of a mobile device 122 and biometric device 126 associated with the end user). Another exemplary alert level may comprise notifying at least one clinician of the detected adverse event so that the clinician can evaluate the severity of the event and intervene as they determine appropriate. Another exemplary alert level may comprise notifying emergency responders of the need for assistance in association with the detected adverse event. Any combination of the above alerts may be used for a given adverse event. Alert engine 116 may log alerts for later review and/or analysis. Logging alerts may comprise logging at least one of the corresponding data associated with the alert and the model (or model information) which triggered the alert.

Intervention engine 114 is operable to provide interventional assistance to end users (e.g. pregnant individuals) throughout a pregnancy monitoring process. In one aspect, intervention engine 114 is operable to connect clinicians (e.g. physicians, nurses, etc.) with end users upon detection of an adverse event. Intervention engine 114 may connect an end user with at least one of their primary healthcare provider (or practice) or primary pregnancy healthcare provider (or practice). Intervention engine 114 may connect an end user with a third party healthcare service such as an on-call service ready to assist an end user when an adverse event is detected by monitoring engine 112. In one aspect, intervention engine 114 is operable to connect end users with a clinician at the request of the end user, such as when the end user is seeking advice on a pregnancy related matter or has a pregnancy related concern.

Meta analysis engine 221 is operable to aggregate data across a plurality of users over time for meta analysis purposes. Meta analysis engine 221 may aggregate data on a large scale (e.g. from thousands of pregnancies to millions of pregnancies or more) over an extended duration (e.g. from months to years or more). Meta analysis engine 221 may analyze the aggregated data to identify at least one of healthy pregnancy related factors (or trends) and unhealthy pregnancy related factors (or trends). Meta analysis engine 221 may be operable to make recommendations to at least one of end users (e.g. pregnant individuals or those preparing for pregnancy) and healthcare providers regarding best practices for pregnancy health based on the meta analysis findings.

FIG. 3I illustrates an exemplary process for training and applying models for monitoring pregnancy health according to one embodiment of the invention. The process comprises obtaining historical health data 301, labeling health data 302, applying a plurality of models 303, determining a best fitting model 304, obtaining real-time data 311, applying selected model 313, sending model output to monitoring classification system 315, determining if a trigger condition has been met 317, deploying alerting system 319, determining an appropriate trigger/alert level 321, and performing meta analysis recommendations 329. The process may comprise additional steps, fewer steps, and/or a different order of steps without departing from the scope of the invention as would be apparent to one of ordinary skill in the art.

At step 301, the process may comprise obtaining historical data. The historical data may comprise historical health data associated with a plurality of past pregnancies of a plurality of individuals. Historical data may comprise at least one of historical data obtained from end users (e.g. pregnant individuals) such as via end user devices such as biometric devices and/or mobile devices. Historical data may comprise data obtained from databases such as from health information databases (such as human studies data, insurance company data, emergency medical services data, hospital data, etc.).

At step 303, the process may comprise labeling the historical health data. Labeling may comprise labeling the data in a manner that is sufficient to enable the data to be used for model training purposes. Labeling may comprise at least one of cleaning and standardizing the format of the historical data.

At step 307, the process may comprise applying a plurality of models to the historical data. Applying a plurality of models may comprise training at least one model using the historical data such that the model is trained to generate outputs indicative of pregnancy related health factors. Applying a plurality of models may comprise applying different model types to the historical data, such as those described above in association with training engine 209.

At step 309, the plurality of models may be analyzed to identify a model that best fits the historical data and/or serves as a best indicator or predictor of adverse outcomes based on the historical data. A plurality of different models may be identified as best fit models for different conditions or scenarios.

At step 311, the process may comprise obtaining real-time (or near real-time) data. Real-time data may comprise monitoring data obtained from end user devices such as biometric and/or mobile devices as the data becomes available from those devices (e.g. is pushed from the devices and/or via a data pull request).

At step 313, the process may comprise applying at least one selected model. The applied model may be selected based on the best fit analysis of step 309. The applied model may be selected based on characteristics of the obtained data and/or a condition or scenario to be evaluated. The applied model may comprise a model derived using the model management systems and methods described above in association with FIG. 1-3F.

At step 315, the process may comprise providing the output of the applied model to a monitoring classification system (or monitoring engine such as monitoring engine 112 described above). The monitoring classification system may evaluate the output with respect to established criteria to determine if triggering criteria have been met.

At step 317, the process may comprise determining subsequent steps based on the monitoring classification systems evaluation of triggering criteria. For example, when no triggering condition has been satisfied, the process may proceed to step 329 wherein at least one of the obtained data, applied model, model output and monitoring classification results are provided to meta analysis system for storage and/or analysis. When a triggering condition has been met, the process may proceed to step 319 to initiate alerting system.

At step 319, the process may comprise deploying alert system such as alert engine 116 as described above. In one aspect, deploying the alert system may comprise determining a trigger level (at step 321) based on at least one of the output of the model applied at step 313 and the analysis by the monitoring classification system at step 315. In the exemplary embodiment, three triggering levels are depicted including level 1 (at 323), level 2 (at 325) and level 3 (at 327), however more or less trigger levels could be used without departing from the scope of the invention. In one aspect, the trigger level may determine the type of alert provided to an end user and a recommendation of the urgency level with which they should seek medical attention. For example, trigger level 1 may be the lowest level of urgency where the end user is simply notified of a potentially adverse event (e.g. something to watch to see if it changes or self-resolves such as a change in blood pressure or oxygen saturation), level 2 may comprise a recommendation that the end user consult with their physician (e.g. something that should be presented to a clinician for diagnostic evaluation, but does not appear urgent), and level 3 may comprise a recommendation that the end user seek immediate medical attention (e.g. something that requires diagnostic evaluation immediately). As another example, the different trigger levels may comprise alerting different individuals. For example, trigger level 1 may comprise alerting the end user (e.g. pregnant individual being monitored) of the indication of an adverse (or potentially adverse) event, trigger level 2 may comprise alerting a clinician associated with the end user, and trigger level 3 may comprise alerting emergency medical services. These are merely exemplary trigger level scenarios and any number of different trigger levels and variations in trigger level structure and outcome may be used without departing from the scope of the invention. Regardless of the determined trigger level or the number of trigger levels used, the results may be provided to meta analysis system for storage and/or analysis.

At step 329, the process may proceed aggregation and/or meta analysis of obtained data. As the process is repeated over time across a plurality of users and across a plurality of different pregnancies, a large pool of metadata may be accumulated and analyzed. In one aspect, the accumulated data may be analyzed to identify best practices and/or make recommendations to at least one of healthcare providers and end users (e.g. pregnant individuals or those seeking to become pregnant).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the local processing system 152, global processing system 153, data processing system 170 and subcomponents thereof, edge 120 devices, and user devices 110a, 110b may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
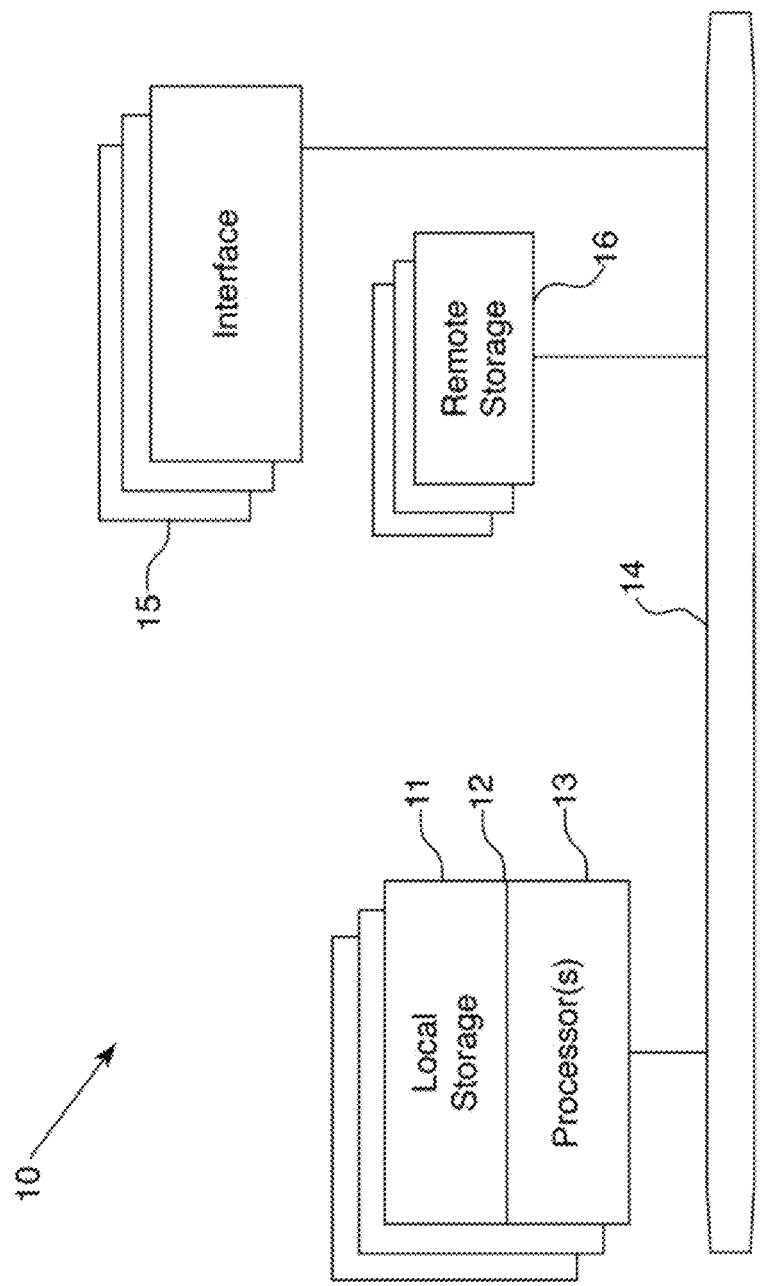
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs).

Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
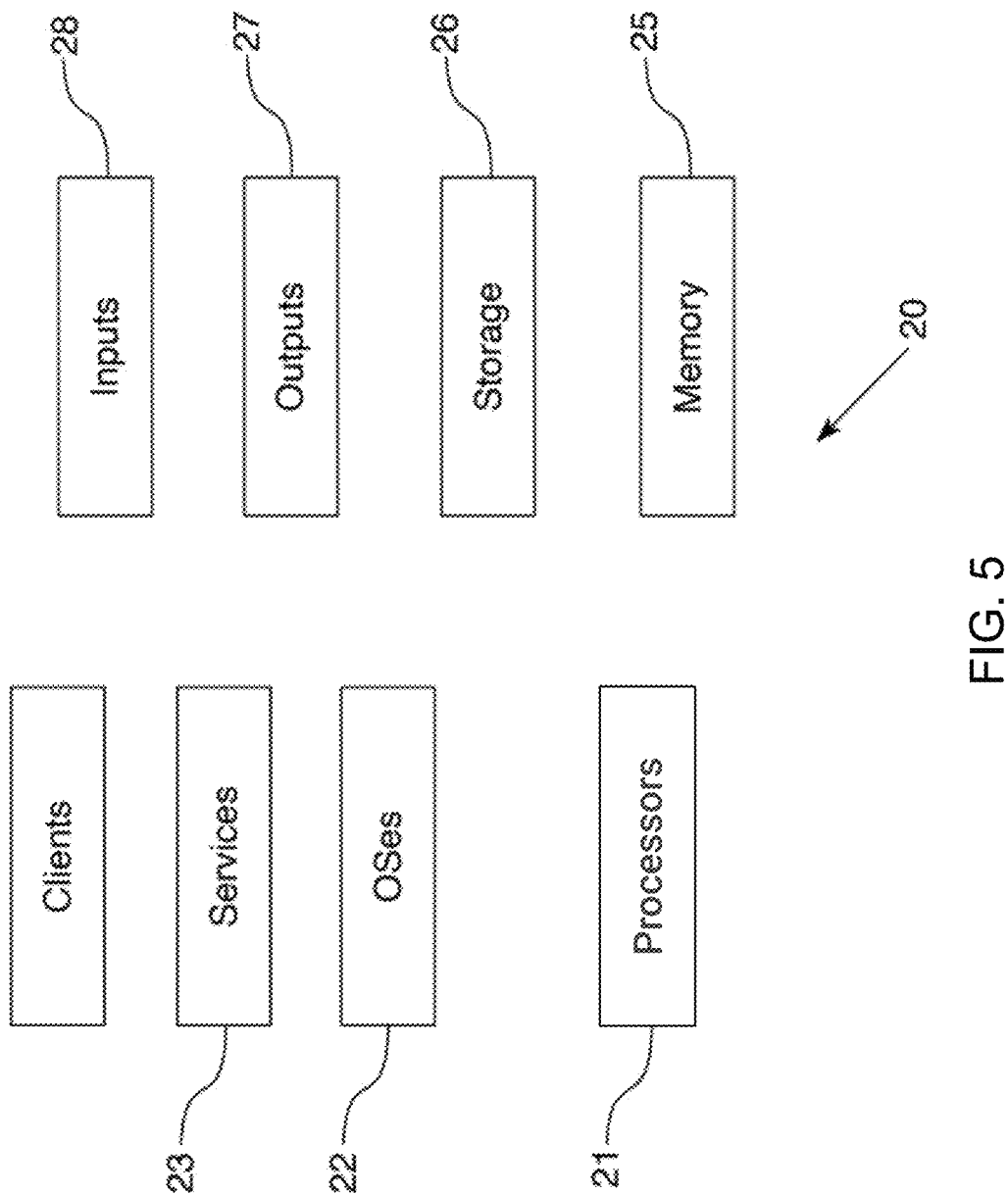
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
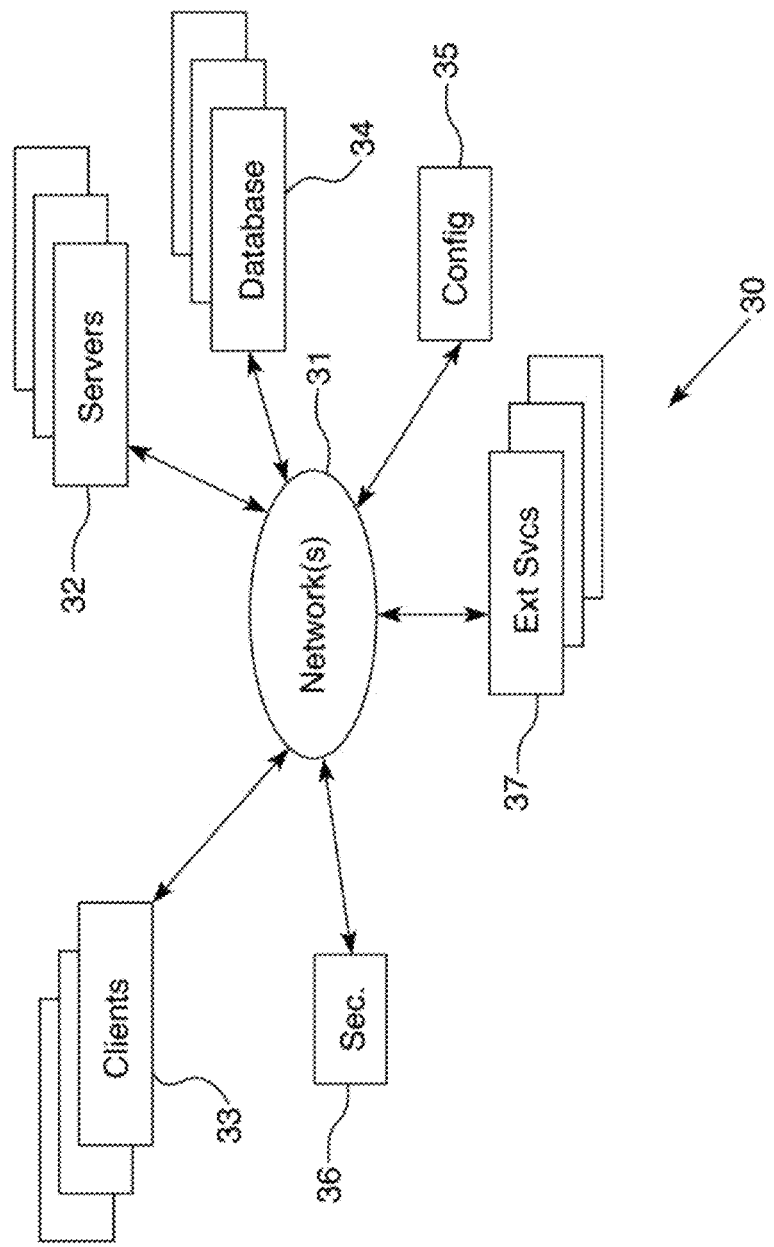
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
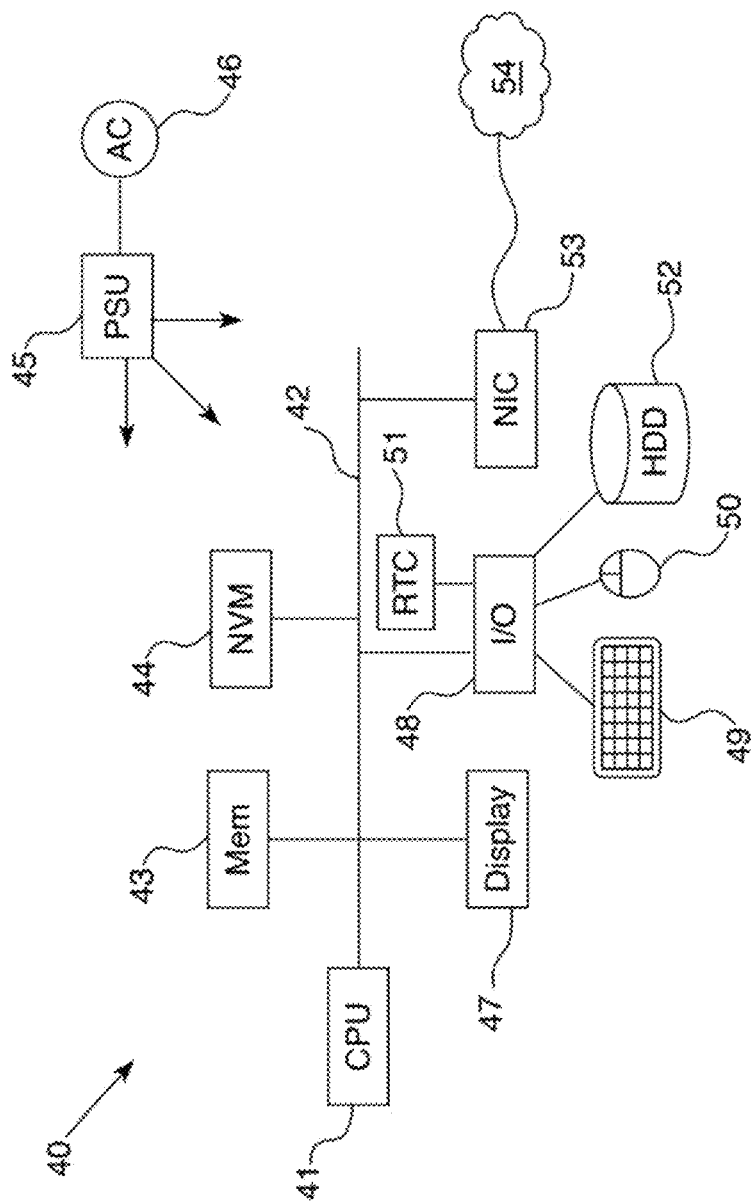
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for edge device level security analytics, the computer implemented method comprising:
    creating a first local model on a first user device by deploying a first central model to the first user device, wherein the first central model is trained to analyze user data and provide at least one predictive inference;
    obtaining, in near real-time, digital data associated with a user, the digital data obtained at the first user device, the digital data associated with at least one of user physiology data and health data;
    generating, at the first user device, a first data set from at least a portion of the obtained digital data;
    applying, at the first user device, a local data security review to the first data set, wherein the local data security review comprises monitoring the first data set, at the first user device through an edge sensor, where the edge sensor uses at least one generated edge threshold to identify data anomalies;
    filtering, at the first user device, the first data set to exclude the data anomalies;
    generating, at the first user device, a second data set by applying differential privacy techniques to the first data set when no data anomalies are identified or to the filtered first data set when data anomalies are identified;
    training, at the first user device, a second local model using the second data set;
    applying, at the first user device, a local model security review to the second local model;
    applying, at a central model processing system, a central model security review to the second local model;
    combining, at the central model processing system, the second local model with a third local model received from a second user device;
    auditing, at the central model processing system, performance of the first central model based on analysis of the combined second and third local models to generate audit metrics;
    updating, at the central model processing system, the central model based on the audit metrics; and
    deploying the updated central model to a plurality of user devices.

2. The computer implemented method according to claim 1, wherein the digital data is obtained through an API.

3. The computer implemented method according to claim 1, wherein the local data security review comprises
    identifying on the user device a malicious data set on the user device from the first set of data that failed a threshold analysis by the at least one edge sensors; and
    reporting the threshold failure associated with the malicious data set.

4. The computer implemented method according to claim 1, further comprising converting the first data set into a standardized format.

5. The computer implemented method according to claim 1, wherein auditing the performance of the first central model comprises at least one of failure mode and effects analysis (FMEA), security testing, and non-failure mode and effects analysis.

6. The computer implemented method according to claim 1, wherein updating the first central model based on the audit metrics further comprises electronic design automation, feature engineering, training the model, evaluation of the model; wherein auditing and FMEA is conducted on the model during each of the steps of updating the central model.

7. The computer implemented method according to claim 1, further comprising registering an audited and finalized model; and
    receiving user input to evaluate the permission to update the local model.

8. The computer implemented method according to claim 1, wherein updating the first local model comprises failure modes and effects analysis (FMEA), smoke testing, checking the obtained data, and unit testing.

9. The computer implemented method according to claim 1, further comprising implementing a security system within the model training and data monitoring of the pipeline for adversarial attacks.

10. The computer implemented method according to claim 1, wherein the central model receives differentiated data if a user provides a sharing permission.

11. The computer implemented method according to claim 1, further comprising training the second model on locally obtained data.

12. The computer implemented method according to claim 1, wherein the user health data may comprise at least one of dietary information, exercise and activity.

13. The computer implemented method according to claim 1, wherein the physiology data may comprise at least one of pulse, respiration rate, blood pressure, electrocardiogram, caloric expenditure, fetal kick counts, mental health, pain, bleeding, and contractions gathered over time at a first sampling frequency.

14. The computer implemented method according to claim 1, wherein the predictive inference is associated with pregnancy outcomes.

15. The computer implemented method according to claim 1, further comprising obtaining a pregnancy outcome metric by applying the first local model to the second data set.

16. The computer implemented method according to claim 15, further comprising providing an alert to at least one of a user and a healthcare practitioner based on the pregnancy outcome metric; wherein the healthcare practitioner comprises at least one of emergency medical services, a physician or practice associated with providing care for the user.

17. The computer implemented method according to claim 16, wherein providing an alert comprises comparing the pregnancy outcome metric to a threshold, wherein the pregnancy outcome metric comprises an indication of a positive outcome or a negative outcome.

18. The computer implemented method according to claim 1, wherein updating the central model comprises re-training the central model to predict pregnancy outcomes based on the aggregated local models.

19. A computing system for edge device level security analytics, the computing system comprising:
    at least one computing processor; and
    memory comprising instructions that, when executed by the at least one computing processor, enable the computing system to:
    create a first local model on a first user device by deploying a first central model to the first user device, wherein the first central model is trained to analyze user data and provide at least one predictive inference;
    obtain, in near real-time, digital data associated with a user, the digital data obtained from the first user device, the digital data associated with at least one of user physiology data and health data;
    generate, at the first user device, a first data set from at least one of a portion of the obtained digital data;
    apply, at the first user device, a local data security review to the first data set, wherein the local data security review comprises monitoring the first data set, at the first user device through an edge sensor, where the edge sensor uses at least one generated edge threshold to identify data anomalies;
    filter, at the first user device, the first data set to exclude the data anomalies;
    generate, at the first user device, a second data set by applying differential privacy techniques to the first data set when no data anomalies are identified or to the filtered first data set when data anomalies are identified;
    train, at the first user device, a second local model using the second data set;
    apply, at the first user device, a local model security review to the second local model;
    apply, at a central model processing system, a central model security review to the second local model;
    combine, at the central model processing system, the second local model with a third local model received from a second user device;
    audit, at a central model processing system, performance of the first central model based on analysis of the combined second and third local models to generate audit metrics;
    update, at a central model processing system, the central model based on the audit metrics; and
    deploy the updated central model to a plurality of user devices.

20. A non-transitory computer readable medium comprising instructions that when executed by a processor enable the processor to:
    create a first local model on a first user device by deploying a first central model to the first user device, wherein the first central model is trained to analyze user data and provide at least one predictive inference;
    obtain, in near real-time, digital data associated with a user, the digital data obtained from the first user device, the digital data associated with at least one of user physiology data and health data;
    generate, at the first user device, a first data set from at least one of a portion of the obtained digital data;
    apply, at the first user device, a local data security review to the first data set, wherein the local data security review comprises monitoring the first data set, at the first user device through an edge sensor, where the edge sensor uses at least one generated edge threshold to identify data anomalies;
    filtering, at the first user device, the first data set to exclude the data anomalies;

generate, at the first user device, a second data set by applying differential privacy techniques to the first data set when no data anomalies are identified or to the filtered first data set when data anomalies are identified;
train, at the first user device, a second local model using the second data set;
apply, at the first user device, a local model security review to the second local model;
apply a central model security review to the second local model;
combine, at the central model processing system, the second local model with a third local model received from a second user device;
audit, at a central model processing system, performance of the first central model based on analysis of the combined second and third local models to generate audit metrics;
update, at a central model processing system, the central model based on the audit metrics; and
deploy the updated central model to a plurality of user devices.

* * * * *